US012703363B2

(12) United States Patent
Ozaki et al.

(10) Patent No.: US 12,703,363 B2
(45) Date of Patent: Aug. 11, 2026

(54) VEHICLE CONTROL DEVICE

(71) Applicant: HITACHI ASTEMO, LTD., Hitachinaka (JP)

(72) Inventors: Koichiro Ozaki, Tokyo (JP); Yoshiyuki Yoshida, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 43 days.

(21) Appl. No.: 18/717,033

(22) PCT Filed: Aug. 24, 2022

(86) PCT No.: PCT/JP2022/031802
§ 371 (c)(1),
(2) Date: Jun. 6, 2024

(87) PCT Pub. No.: WO2023/132098
PCT Pub. Date: Jul. 13, 2023

(65) Prior Publication Data

US 2025/0042398 A1 Feb. 6, 2025

(30) Foreign Application Priority Data

Jan. 5, 2022 (JP) ................................ 2022-000543

(51) Int. Cl.
*B60W 30/16* (2020.01)
*B60W 40/08* (2012.01)
*B60W 50/14* (2020.01)

(52) U.S. Cl.
CPC ............ *B60W 30/16* (2013.01); *B60W 40/08* (2013.01); *B60W 50/14* (2013.01);
(Continued)

(58) Field of Classification Search
CPC . B60W 2040/0818; B60W 2050/0088; B60W 2050/143; B60W 2050/146;
(Continued)

(56) References Cited

U.S. PATENT DOCUMENTS

2017/0169710 A1* 6/2017 Beaurepaire ........... G08G 1/163
2017/0240109 A1* 8/2017 Kimura .................... B60Q 9/00
(Continued)

FOREIGN PATENT DOCUMENTS

| | | | | | |
|---|---|---|---|---|---|
| CN | 112141062 A | * | 12/2020 | | H04W 4/90 |
| JP | 2017-126263 A | | 7/2017 | | |
| WO | WO-2020249122 A1 | * | 12/2020 | | B60W 50/14 |

OTHER PUBLICATIONS

International Search Report with English Translation and Written Opinion of International Patent Application No. PCT/JP2022/031802 dated Nov. 1, 2022 (8 pages).

*Primary Examiner* — Babar Sarwar
(74) *Attorney, Agent, or Firm* — Foley & Lardner LLP

(57) ABSTRACT

Provided is a vehicle control device that uses a target inter-vehicle distance corresponding to a vehicle in front with respect to a travel lane of an ego-vehicle to enable safe travel while securing an inter-vehicle distance that reduces the level of fear the user is made to feel. The vehicle control device 60 calculates the travel lane area (A) of the ego-vehicle mirroring the area (the preceding vehicle blocking area (B) and the viewing angle blocking area (C)) blocked by the vehicle (preceding vehicle) which is in front of the ego-vehicle and the speed of the ego-vehicle, in the area (the travel lane area (A)) of the lane on which the ego-vehicle travels detected by the sensor, and in a case where the calculated travel lane area (A) of the ego-vehicle is equal to or less than a threshold value, performs vehicle control to adjust the inter-vehicle distance between the ego-vehicle and
(Continued)

the vehicle in front, thereby enabling vehicle control while reducing the level of fear the user is made to feel.

16 Claims, 26 Drawing Sheets

(52) U.S. Cl.
CPC ............... *B60W 2040/0818* (2013.01); *B60W 2050/143* (2013.01); *B60W 2050/146* (2013.01); *B60W 2520/10* (2013.01); *B60W 2540/229* (2020.02); *B60W 2552/53* (2020.02); *B60W 2554/4046* (2020.02); *B60W 2554/802* (2020.02)

(58) Field of Classification Search
CPC ......... B60W 2520/10; B60W 2540/00; B60W 2540/229; B60W 2552/00; B60W 2552/53; B60W 2554/4041; B60W 2554/4046; B60W 2554/802; B60W 30/16; B60W 40/08; B60W 50/0205; B60W 50/14; G08G 1/16
See application file for complete search history.

(56) References Cited

U.S. PATENT DOCUMENTS

| | | | | |
|---|---|---|---|---|
| 2018/0089997 | A1* | 3/2018 | Ho | G08G 1/07 |
| 2019/0202476 | A1* | 7/2019 | Tao | B60W 30/095 |
| 2019/0206254 | A1* | 7/2019 | Tao | B60W 30/0956 |
| 2019/0359215 | A1* | 11/2019 | Shimakage | B60K 31/00 |
| 2021/0261133 | A1* | 8/2021 | Sakayori | B60W 30/18163 |
| 2022/0332319 | A1* | 10/2022 | Park | H04W 4/029 |
| 2022/0340134 | A1* | 10/2022 | Goto | B60W 30/16 |
| 2024/0140434 | A1* | 5/2024 | Abe | B60W 30/182 |

* cited by examiner 100
22
16
15
14
20(18)
17
60
VEHICLE
CONTROL
DEVICE
13
12
21
11
25

FIG. 2

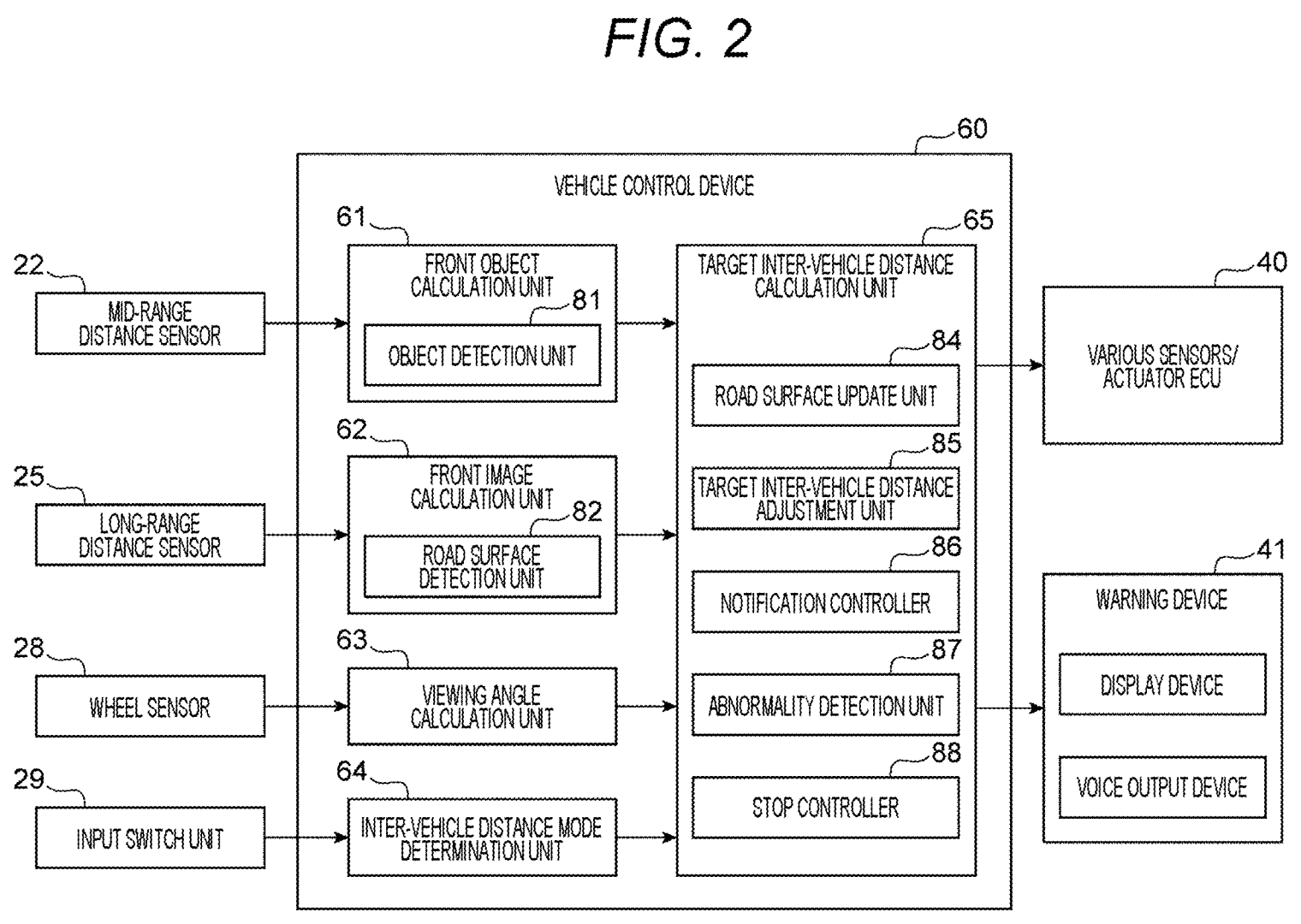

22 MID-RANGE DISTANCE SENSOR
25 LONG-RANGE DISTANCE SENSOR
28 WHEEL SENSOR
29 INPUT SWITCH UNIT
60 VEHICLE CONTROL DEVICE
61 FRONT OBJECT CALCULATION UNIT
81 OBJECT DETECTION UNIT
62 FRONT IMAGE CALCULATION UNIT
82 ROAD SURFACE DETECTION UNIT
63 VIEWING ANGLE CALCULATION UNIT
64 INTER-VEHICLE DISTANCE MODE DETERMINATION UNIT
65 TARGET INTER-VEHICLE DISTANCE CALCULATION UNIT
84 ROAD SURFACE UPDATE UNIT
85 TARGET INTER-VEHICLE DISTANCE ADJUSTMENT UNIT
86 NOTIFICATION CONTROLLER
87 ABNORMALITY DETECTION UNIT
88 STOP CONTROLLER
40 VARIOUS SENSORS/ ACTUATOR ECU
41 WARNING DEVICE
DISPLAY DEVICE
VOICE OUTPUT DEVICE

VEHICLE CONTROL DEVICE

TECHNICAL FIELD

The present invention relates to a vehicle control device that, in a scene in which a user feels fear at a target inter-vehicle distance between an ego-vehicle and a vehicle in front during driving assistance, adjusts the target inter-vehicle distance.

BACKGROUND ART

Conventionally, a vehicle control device has been known that, in a case where a vehicle is traveling behind the vehicle in front (preceding vehicle) during driving assistance (preceding vehicle-tracking automatic travel), tracks the preceding vehicle while maintaining an adequate inter-vehicle distance to enable stopping without colliding with the vehicle in front, even when the vehicle in front suddenly brakes for some reason.

In addition, a technique has been widely used in which an inter-vehicle distance corresponding to the size of the vehicle in front is calculated, and a warning to secure an inter-vehicle distance is issued in a case where the inter-vehicle distance becomes shorter than a threshold value that takes into account the level of fear felt by the user (PTL 1).

CITATION LIST

Patent Literature

PTL 1: JP 2017-126263 A

SUMMARY OF INVENTION

Technical Problem

However, in PTL 1, because an alarm is issued regarding the inter-vehicle distance between the ego-vehicle and the vehicle in front in light of the ratio of blocking by the vehicle in front to a set range, there is a possibility of an erroneous alarm being issued due to the ratio of blocking of the vehicle other than in the travel lane of the ego-vehicle. In addition, the assumption in PTL 1 is that the vehicle will be used during manual driving and in an urban area, and the vehicle being used during driving assistance and on a highway is not assumed or taken into account.

Therefore, the present invention was conceived of to solve the above problems, and an object of the present invention is to provide a vehicle travel control device (vehicle control device) having a driving support function, the vehicle control device using a target inter-vehicle distance corresponding to a vehicle in front with respect to a travel lane of an ego-vehicle to enable safe travel while securing an inter-vehicle distance that reduces the level of fear the user is made to feel.

Solution to Problem

In order to achieve the above object, a vehicle control device of the present invention is a vehicle control device that controls driving and/or braking of an ego-vehicle to perform preceding vehicle-tracking automatic travel, the vehicle control device including: a road surface detection unit that detects a travel lane area of a lane on which the ego-vehicle travels; an object detection unit that detects an object which is in the direction of travel of the ego-vehicle; a road surface update unit that updates the travel lane area on the basis of the travel lane area of the ego-vehicle detected by the road surface detection unit and a preceding vehicle blocking area imparted to a user by a preceding vehicle detected by the object detection unit; and a target inter-vehicle distance adjustment unit that, in light of the travel lane area updated by the road surface update unit, adjusts a target inter-vehicle distance between the ego-vehicle and the preceding vehicle.

Advantageous Effects of Invention

According to the present invention, in a case where there is a vehicle in front in the travel lane of an ego-vehicle, vehicle control (preceding vehicle-tracking automatic travel by controlling driving and/or braking of the ego-vehicle) can be performed using an appropriate target inter-vehicle distance by taking into account a narrow viewing angle blocked by an area which is blocked by the vehicle in front (preceding vehicle blocking area). As a result, it is possible to control the vehicle while reducing the level of fear the user is made to feel.

Problems, configurations, and effects other than those described above will be clarified by the following description of an embodiment.

BRIEF DESCRIPTION OF DRAWINGS

FIG. 2 is an example of a functional block diagram of the vehicle control system equipped with the vehicle control device to which the present embodiment is applied.

DESCRIPTION OF EMBODIMENTS

In the embodiments hereinbelow, when necessary for the sake of convenience, the description will be divided into a plurality of sections or embodiments, but unless otherwise specified, the sections or embodiments are independent of one other, with one section or embodiment being related to some or all modifications, details, supplementary explanations, and the like of another section or embodiment.

Hereinafter, embodiments of a vehicle control device of the present invention will be described with reference to the drawings.

Figure 1:
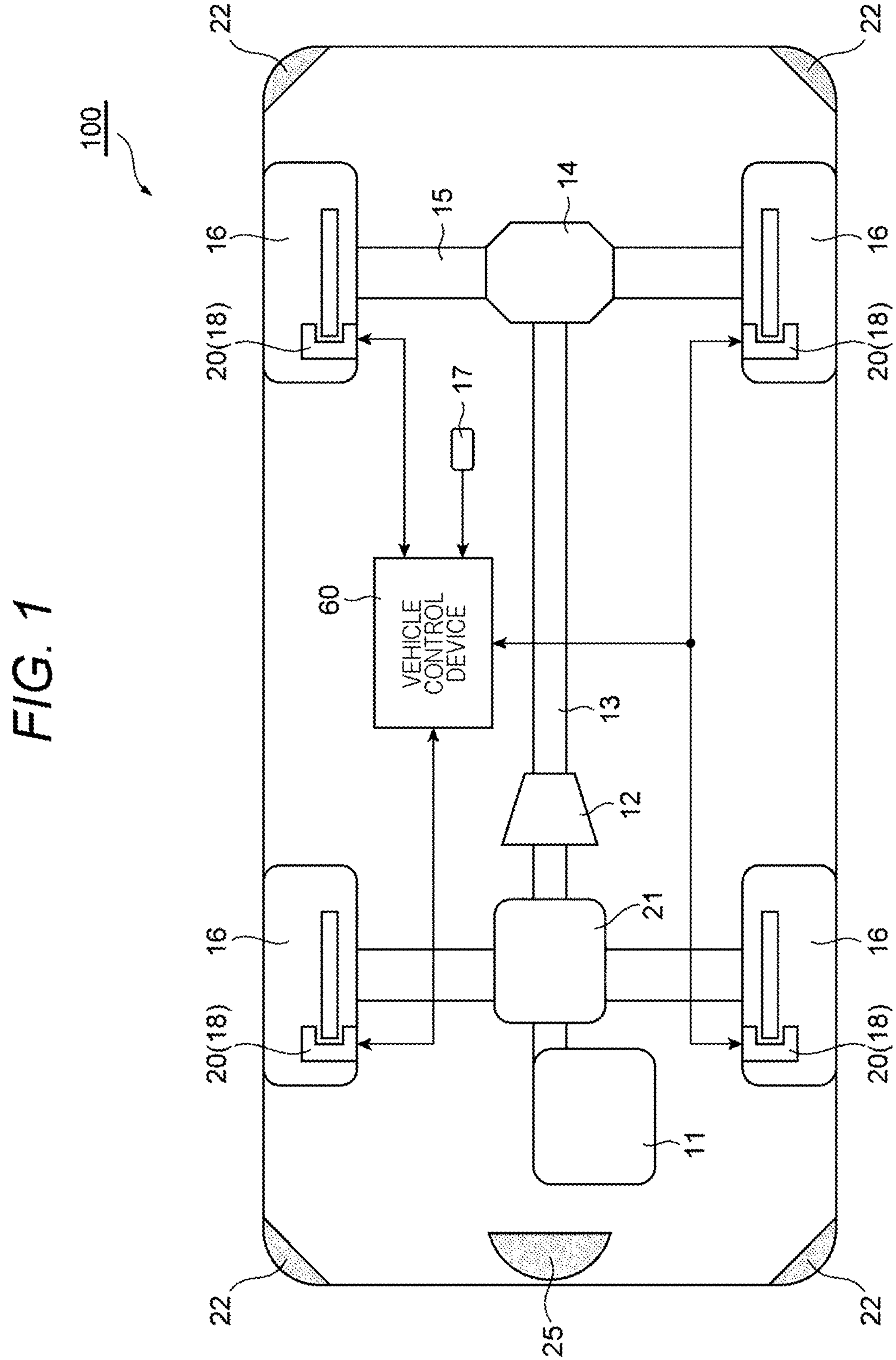
FIG. 1 is an example of a configuration diagram of a vehicle including a vehicle control system equipped with a vehicle control device to which the present embodiment is applied.

FIG. 1 is a configuration diagram of a vehicle according to the present embodiment. A vehicle (ego-vehicle) 100 in the illustrated example is a rear-wheel drive vehicle having a general configuration including, for example, a cylinder injection type gasoline engine (hereinafter, the engine is simply referred to as an engine) 11 serving as a travel power source, an automatic transmission 12 that can be coupled to and detached from the engine 11, a propeller shaft 13, a differential gear 14, a drive shaft 15, a brake device 20 including four wheels 16 and a wheel speed sensor 18, and an electric power steering 21.

In the vehicle 100, devices including a vehicle control device 60 and various sensors 17 to be described below, actuators, and equipment can exchange signals and data through in-vehicle LAN or CAN communication. The vehicle control device 60 obtains information outside the ego-vehicle 100 from various sensors 17 described below, and transmits command values for implementing control such as automatic driving and driving support to the engine 11, the brake device 20 including the wheel speed sensor 18, the electric power steering 21, and the automatic transmission 12. The wheel speed sensor 18 generates a pulse waveform in response to the rotation of the wheels 16 and transmits the pulse waveform to the vehicle control device 60.

Mid-range distance sensors 22 are arranged on the left and right sides of the front and rear of the vehicle 100. Further, a long-range distance sensor 25 is disposed at the front of the vehicle 100. The mid-range distance sensors 22 and the long-range distance sensor 25 constitute the various sensors 17 described above. These sensors detect the road environment such as objects and white lines in the vicinity of the ego-vehicle, and supply the objects and white lines to the vehicle control device 60. The mount positions of the various sensors and the number of the various sensors are not limited to the positions illustrated in FIG. 1.

Note that the illustrated vehicle 100 is an example of a vehicle to which the present embodiment can be applied, and the present embodiment does not limit applicable vehicle configurations. For example, a vehicle for which a continuously variable transmission (CVT) is adopted instead of the automatic transmission 12 may also be used. Further, instead of the engine 11 serving as the travel power source, a motor or a vehicle which uses an engine and a motor as travel power sources may be used. Instead of the rear-wheel drive vehicle, a front-wheel drive vehicle or a four-wheel drive vehicle may be used.

FIG. 2 is a functional block diagram of a vehicle control system to which the present embodiment is applied. The vehicle control system illustrated in FIG. 2 is installed in the vehicle 100 and controls driving and/or braking of the vehicle 100 to implement preceding vehicle-tracking automatic travel, and includes the mid-range distance sensor 22, the long-range distance sensor 25, a wheel sensor 28, an input switch unit 29, various sensors/actuator ECU 40 of the vehicle, a warning device 41, and a vehicle control device 60 connecting these components.

The mid-range distance sensor 22 can be configured by, for example, a millimeter wave radar. The mid-range distance sensor 22 is used to detect a distance to an object by transmitting a radio frequency known as a millimeter wave toward the surroundings of the ego-vehicle and receiving the reflected wave. Distance measurement data by the mid-range distance sensor 22 is inputted to the vehicle control device 60.

The long-range distance sensor 25 can be constituted by a stereo camera, for example. The long-range distance sensor 25 is used to detect a feature point or an object which is in the direction of travel in front of the ego-vehicle, and to detect the distance of the object from the ego-vehicle and the speed of the object from differentiation between the ego-vehicle travel lane and another lane adjacent to the ego-vehicle travel lane, and a difference in object information detected by the left and right cameras. Furthermore, the long-range distance sensor 25 is not limited to a stereo camera, and can be configured by LiDER (Light Detection and Ranging) or the like. Distance measurement data by the long-range distance sensor 25 is inputted to the vehicle control device 60. In the present embodiment, a travel lane area is calculated (described below) on the basis of feature points from image data acquired from cameras.

Feature point which is in the direction of travel denotes, for example, a white line painted on the road surface. In the present embodiment, the types and colors of white lines are not limited and conform to the actual stipulations of the laws and regulations of each country.

The wheel sensor 28 is mounted on each wheel 16 of the ego-vehicle 100 and includes a wheel speed sensor 18 that detects the rotation speed of the wheel 16 and a controller (not illustrated) that integrates detection values detected by the wheel speed sensor 18 to generate a vehicle speed signal. Vehicle speed signal data from the wheel sensor 28 is inputted to the vehicle control device 60.

The input switch unit 29 is, for example, a dedicated mechanical switch provided in the vicinity of the seat of the driver. Furthermore, the input switch unit 29 may be a graphical user interface (GUI) switch or the like. The input switch unit 29 receives, through a user operation, instructions to start or stop the system of this summary of the embodiment that automatically changes the target inter-vehicle distance according to a level of fear, and instructions to start or stop constant speed travel by controlling the vehicle at a predetermined target vehicle speed.

The various sensors/actuator ECU 40 may be any known ECU, and denotes, for example, mechanical elements such as an accelerator pedal for operating a driving force, a brake pedal for operating a braking force, a parking brake, steering for operating the direction of travel of the vehicle 100, and a shift lever for operating the direction of travel of the vehicle 100, and a signal conversion device.

The warning device 41 notifies the user (occupant) of a state and a change in the target inter-vehicle distance of the ego-vehicle 100 determined by fear (described below) and cancellation of vehicle control (in other words, some or all of the functions of the vehicle travel control are stopped). For example, the state and change in the target inter-vehicle distance and the start, release, and stoppage of the vehicle control are reported using a liquid crystal display serving as a display device, and a speaker serving as a voice output device.

The vehicle control device 60 outputs control instructions (command values) to the various sensors/actuator ECU 40 and the warning device 41 on the basis of information inputted from the mid-range distance sensor 22, the long-range distance sensor 25, the wheel sensor 28, and the input switch unit 29.

The vehicle control device 60 includes a front object calculation unit 61, a front image calculation unit 62, a viewing angle calculation unit 63, an inter-vehicle distance mode determination unit 64, and a target inter-vehicle distance calculation unit 65.

The front object calculation unit 61 calculates the inter-vehicle distance between the ego-vehicle and the object from the detection information of the mid-range distance sensor 22, and outputs the calculation result to the target inter-vehicle distance calculation unit 65.

In the present embodiment, the front object calculation unit 61 includes an object detection unit 81 that detects an object in the direction of travel (in front) of the ego-vehicle from detection information of the mid-range distance sensor 22 and calculates (detects) the inter-vehicle distance between the ego-vehicle and the object. In addition, for example, the object detection unit 81 detects the outline of the object and calculates the area enclosed by the outline, thus calculating a preceding vehicle blocking area (in other words, the field of view or the viewing angle of the user is blocked) by the object (in particular, the preceding vehicle) to (a field of view or a viewing angle of) the user (details will be described below). Calculation data by the object detection unit 81 is inputted to the target inter-vehicle distance calculation unit 65.

The input information of the front object calculation unit 61 is not limited to the mid-range distance sensor 22. For example, the long-range distance sensor 25 or a combination of the mid-range distance sensor 22 and the long-range distance sensor 25 may be used.

The front image calculation unit 62 calculates the recognition of the travel lane in front of the ego-vehicle and the size of the object from the detection information of the long-range distance sensor 25, and outputs the calculation result to the target inter-vehicle distance calculation unit 65.

In the present embodiment, the front image calculation unit 62 includes a road surface detection unit 82 that recognizes the travel lane in the direction of travel of the ego-vehicle from the detection information of the long-range distance sensor 25 and detects the travel lane area, which is the size of the lane on which the ego-vehicle travels. In the present embodiment, a travel lane area is calculated on the basis of feature points in light of image data acquired from cameras (details will be described below). Calculation data by the road surface detection unit 82 is inputted to the target inter-vehicle distance calculation unit 65.

In addition, the input information of the front image calculation unit 62 is not limited to the long-range distance sensor 25. For example, the mid-range distance sensor 22 or a combination of the mid-range distance sensor 22 and the long-range distance sensor 25 may be used.

The viewing angle calculation unit 63 calculates viewing angle information from detection information of the wheel sensor 28 (that is, the speed of the ego-vehicle 100), and outputs the calculation result to the target inter-vehicle distance calculation unit 65.

The viewing angle information described above indicates a region representing the effect of a viewing angle on (the view or the viewing angle of) the user, and indicates a region that, depending on the vehicle speed, cannot be visually recognized by the user. The higher the vehicle speed, the narrower the viewing angle becomes, and hence the region that cannot be visually recognized by the user becomes larger. In the present embodiment, this region is referred to as the viewing angle blocking area, which is set in light of the speed of the ego-vehicle 100.

The inter-vehicle distance mode determination unit 64 determines, from the information of the input switch unit 29, activation and cancellation of the system of this summary of the embodiment that automatically changes the target inter-vehicle distance according to a level of fear, and outputs the determination result to the target inter-vehicle distance calculation unit 65.

The target inter-vehicle distance calculation unit 65 calculates a target inter-vehicle distance from information of (the object detection unit 81 of) the front object calculation unit 61, (the road surface detection unit 82 of) the front image calculation unit 62, the viewing angle calculation unit 63, and the inter-vehicle distance mode determination unit 64, calculates a target value for controlling the various sensors/actuator ECU 40, and outputs control instructions (command values). In addition, the target inter-vehicle distance calculation unit 65 outputs the control instructions (command values) to the warning device 41 on the basis of the calculation results of the target inter-vehicle distance, and the like.

In the present embodiment, the target inter-vehicle distance calculation unit 65 includes a road surface update unit

84, a target inter-vehicle distance adjustment unit 85, a notification controller 86, an abnormality detection unit 87, and a stop controller 88.

The road surface update unit 84 updates the travel lane area on the basis of the travel lane area calculated (detected) by the road surface detection unit 82 and the preceding vehicle blocking area calculated (detected) by the object detection unit 81, in light of the calculation information of (the object detection unit 81 of) the front object calculation unit 61 and (the road surface detection unit 82 of) the front image calculation unit 62. That is, in the image data acquired from the cameras, the road surface update unit 84 updates, as the travel lane area, a portion obtained by excluding the area enclosed by the outline of the detected object from the area of the lane on which the ego-vehicle travels. The road surface update unit 84 updates the travel lane area by mirroring the viewing angle blocking area calculated (detected) by the viewing angle calculation unit 63 on the travel lane area from the calculation information of the viewing angle calculation unit 63. As a result, a travel lane area serving as a determination index (control index) of the fear that the object (in particular, the preceding vehicle) makes the user feel is calculated (details will be described below). The road surface update unit 84 outputs the updated travel lane area to the target inter-vehicle distance adjustment unit 85.

The target inter-vehicle distance adjustment unit 85 adjusts the target inter-vehicle distance between the ego-vehicle and the preceding vehicle from the travel lane area updated by the road surface update unit 84. For example, when the travel lane area is equal to or less than the threshold value, the target inter-vehicle distance adjustment unit 85 sets the target inter-vehicle distance between the ego-vehicle and the preceding vehicle to the maximum target inter-vehicle distance set in advance by the vehicle control system. Note that a setting value in a case where the travel lane area is equal to or less than the threshold value is not limited to the maximum target inter-vehicle distance, and it is sufficient that the setting value can be extended from the default value of the target inter-vehicle distance set in advance by the vehicle control system. In a case where the travel lane area is greater than the threshold value (in other words, when the target inter-vehicle distance is not adjusted from the travel lane area), the target inter-vehicle distance adjustment unit 85 sets the target inter-vehicle distance between the ego-vehicle and the preceding vehicle to a default value.

Here, as the default value, a value set in advance by the vehicle control system (a system that automatically changes the target inter-vehicle distance) or a value arbitrarily set by the user can be used.

The target inter-vehicle distance adjustment unit 85 calculates, from the set target inter-vehicle distance, a target value for controlling the various sensors/actuator ECU 40 in order to secure an inter-vehicle distance between the ego-vehicle and the preceding vehicle, and outputs a control instruction (command value).

The notification controller 86 outputs, to the warning device 41, a control instruction (command value) to notify the user of various information. The various types of information include, for example, the state and change in the target inter-vehicle distance from the target inter-vehicle distance adjustment unit 85, information of the object from (the object detection unit 81 of) the front object calculation unit 61, travel environment information of the ego-vehicle and information on the surroundings thereof from (the road surface detection unit 82 of) the front image calculation unit 62, information from the inter-vehicle distance mode determination unit 64, information from the abnormality detection unit 87 and the stop controller 88 described below, and the like.

The abnormality detection unit 87 performs detection of abnormalities in each of the functional blocks (61 (81), 62 (82), 63, 64, 84, 85), and outputs the detection results to the notification controller 86 and the stop controller 88.

The stop controller 88 calculates, from the detection information of the abnormality detection unit 87 (that is, in a case where the abnormality detection unit 87 detects an abnormality), a target value for controlling the various sensors/actuator ECU 40 in order to stop some or all of the functions of the vehicle travel control, and outputs control instructions (command values).

The notification controller 86 outputs a control instruction (command value) to notify the user to the warning device 41 in a case where the abnormality detection unit 87 detects an abnormality or in a case where the stop controller 88 stops some or all of the functions of the vehicle travel control.

Figure 3:
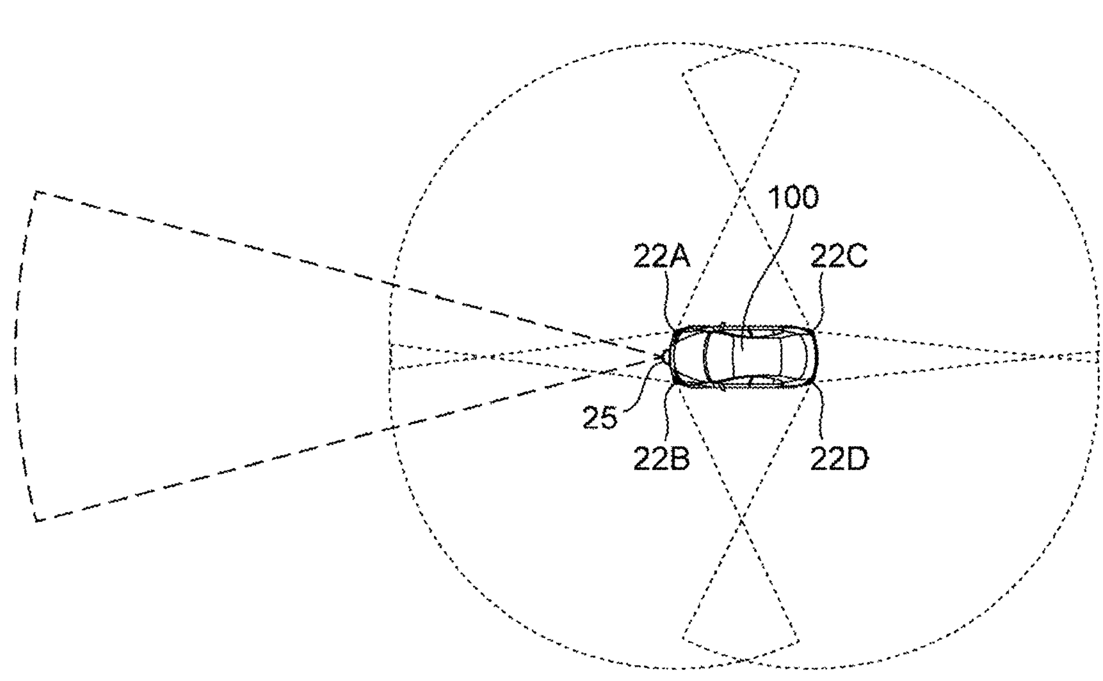
FIG. 3 is an example of an overhead view illustrating a recognition region by a mid-range distance sensor and a long-range distance sensor mounted on an ego-vehicle.

FIG. 3 is an overhead view of an example showing the arrangement and detection ranges (also referred to as the recognition regions) of the mid-range distance sensors 22 (22A to 22D) mounted at the front of and at the rear of the ego-vehicle and the long-range distance sensor 25 mounted at the front of the ego-vehicle.

As illustrated in FIG. 3, the mid-range distance sensors 22A and 22B are arranged at the front of the ego-vehicle 100, and the mid-range distance sensors 22C and 22D are arranged at the rear of the ego-vehicle 100. The fan shapes indicated by the dotted line in FIG. 3 represent examples of the detection ranges of each of the mid-range distance sensors 22A to 22D.

As illustrated in FIG. 3, the long-range distance sensor 25 is disposed at the front of the ego-vehicle 100. The fan shape indicated by the broken lines in FIG. 3 illustrates an example of the detection range of the long-range distance sensor 25.

FIGS. 4 to 9 are diagrams illustrating, by the size of an object 101 and the inter-vehicle distance between the ego-vehicle 100 and the object 101, the level of fear the user is made to feel. In the present embodiment, the object 101 is a vehicle (preceding vehicle) traveling in front of the ego-vehicle 100. The user is assumed to be a driver and a passenger (in other words, an occupant of the ego-vehicle 100) operating the ego-vehicle 100.

Figure 4:
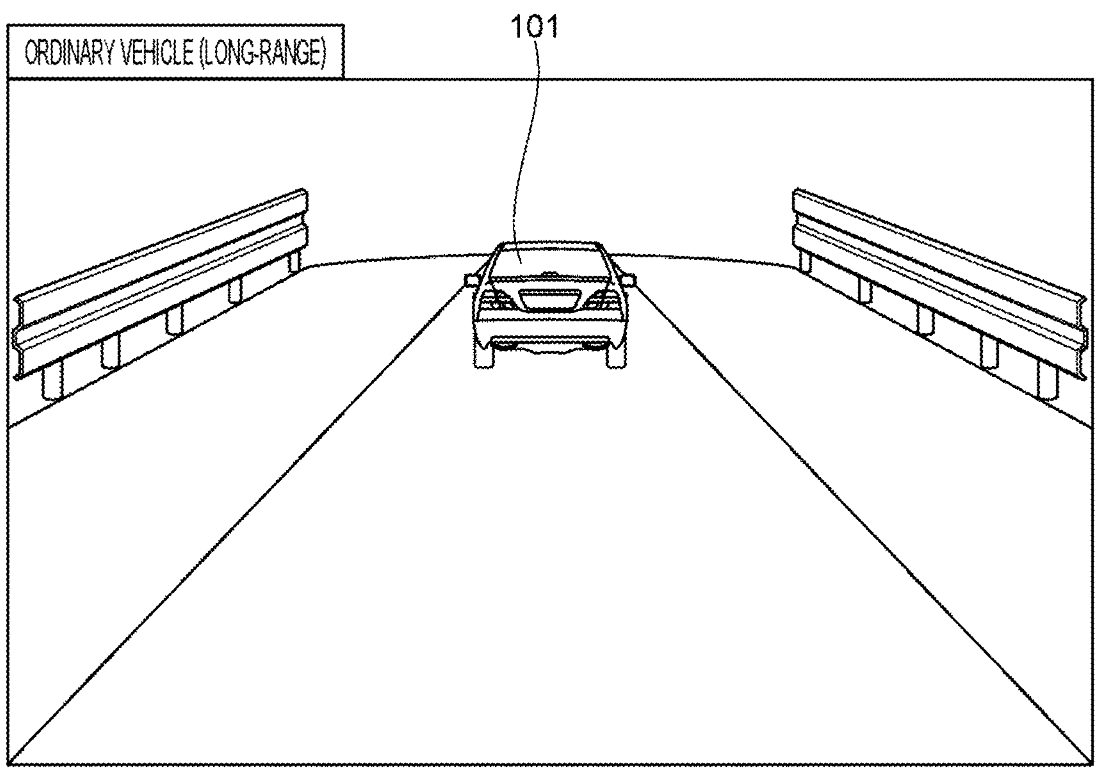
FIG. 4 is an example of a travel scene in which an object is an ordinary vehicle and is at a long range from the ego-vehicle.
Figure 5:
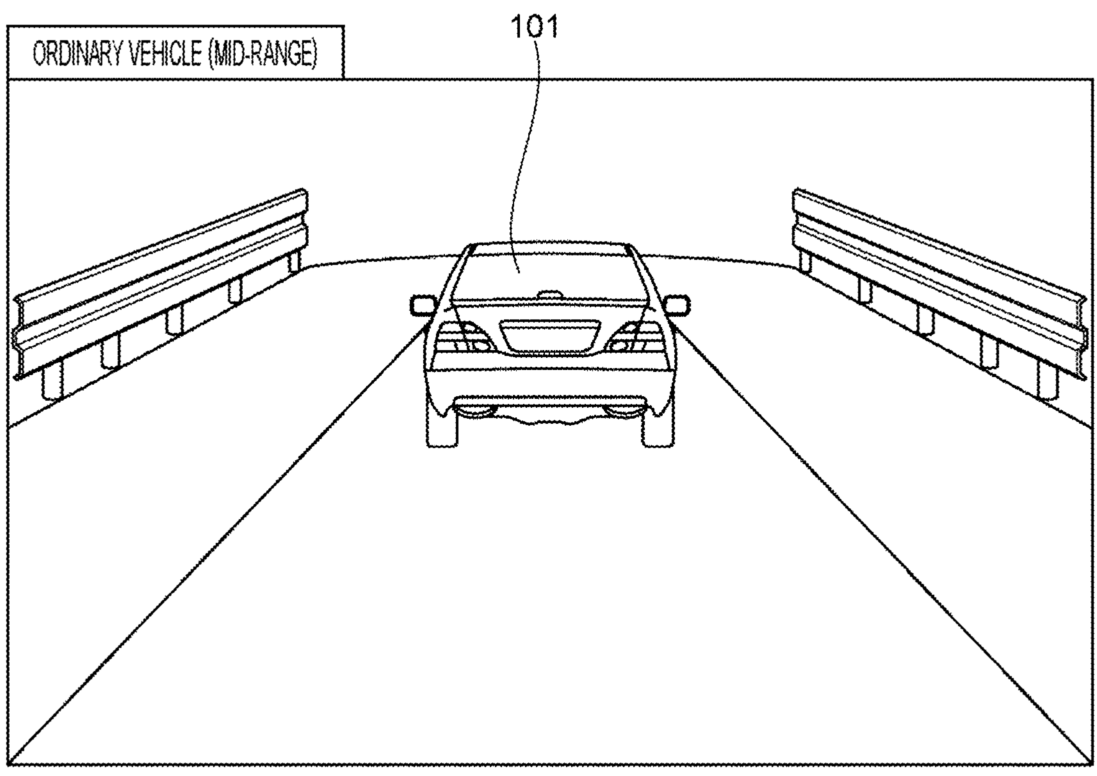
FIG. 5 is an example of a travel scene in which an object is an ordinary vehicle and is at a mid-range from the ego-vehicle.
Figure 6:
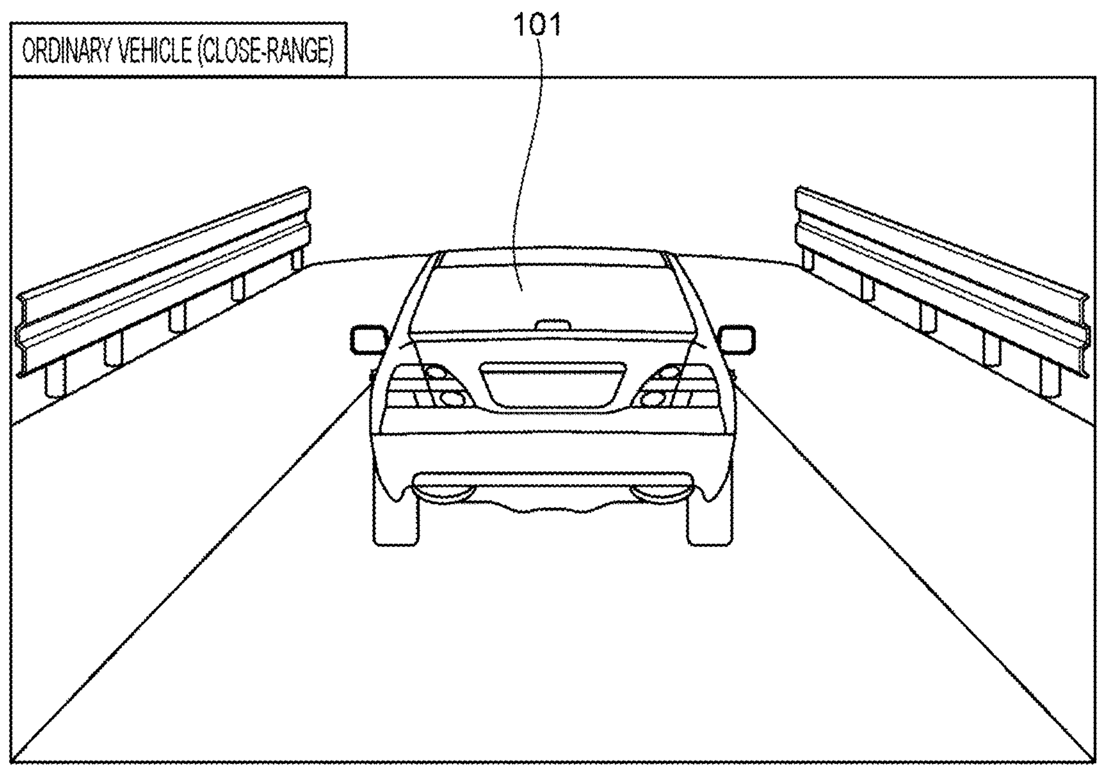
FIG. 6 is an example of a travel scene in which an object is an ordinary vehicle and is at a short range from the ego-vehicle.

FIGS. 4 to 6 illustrate a travel scene in which the object 101 is an ordinary vehicle.

In the travel scene of FIG. 4, the object 101 is far from the ego-vehicle, the range in which the user can visually recognize the front and the surroundings is large, and the range that is blocked by the object 101 and cannot be visually recognized is small. Similarly, as the travel scene changes to the travel scenes of FIGS. 5 and 6, the object 101 approaches the ego-vehicle, but the range that can be visually recognized by the user is large in any travel scene.

That is, in a case where the object 101 is an ordinary vehicle, a two-wheeled vehicle, or the like, the user can check the front and the surroundings of the object 101 ahead. Therefore, the user can drive while predicting the travel situation while visually grasping the situation in front and in the surroundings. Accordingly, in the travel scenes of FIGS. 4 to 6, the level of fear which the user is made to feel is low.

Figure 7:
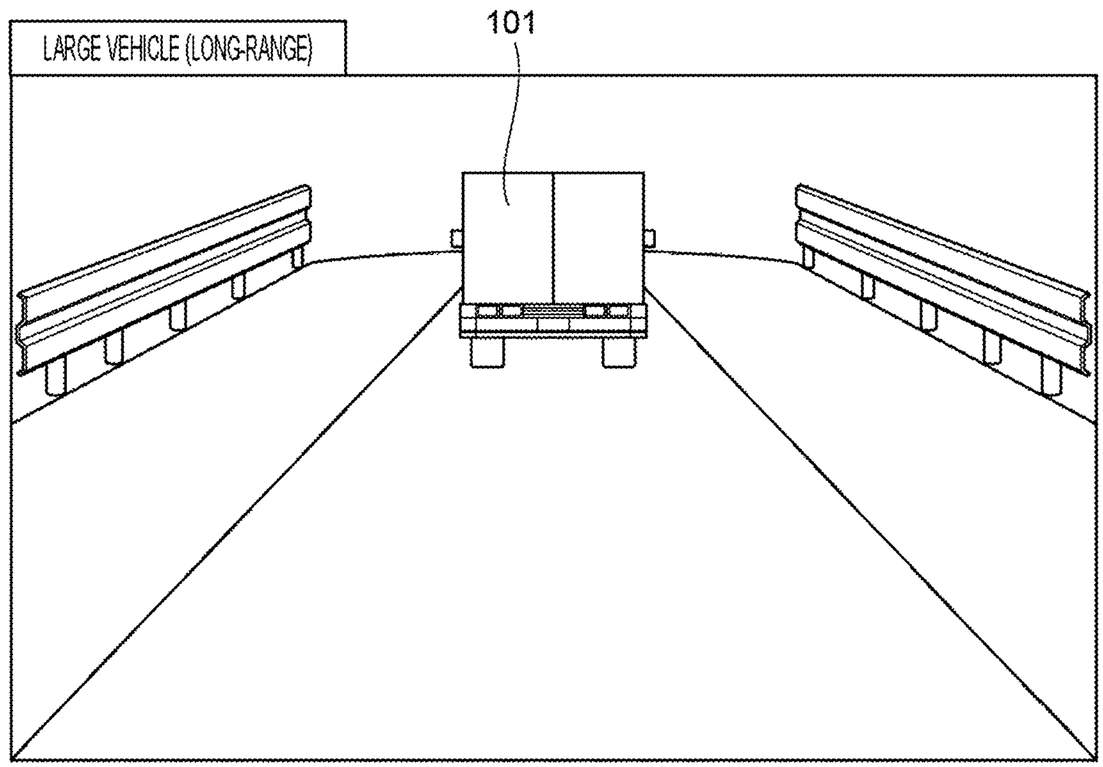
FIG. 7 is an example of a travel scene in which an object is a large vehicle and is at a long range from the ego-vehicle.
Figure 8:
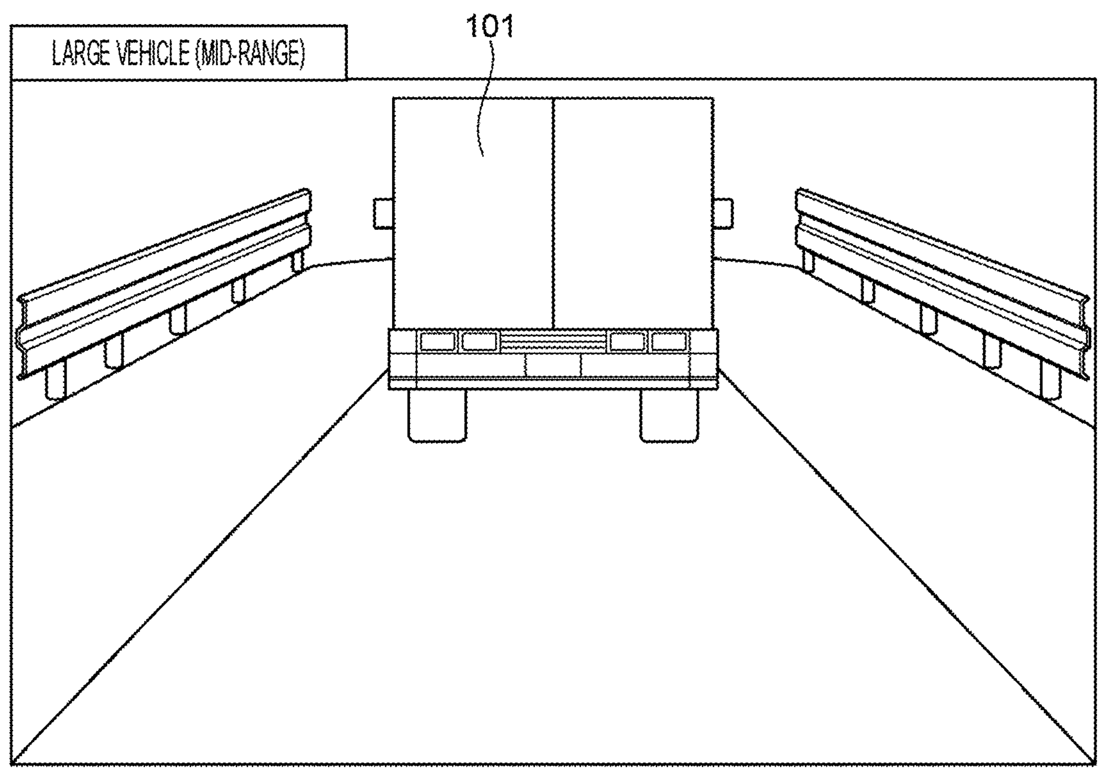
FIG. 8 is an example of a travel scene in which an object is a large vehicle and is at a mid-range from the ego-vehicle.
Figure 9:
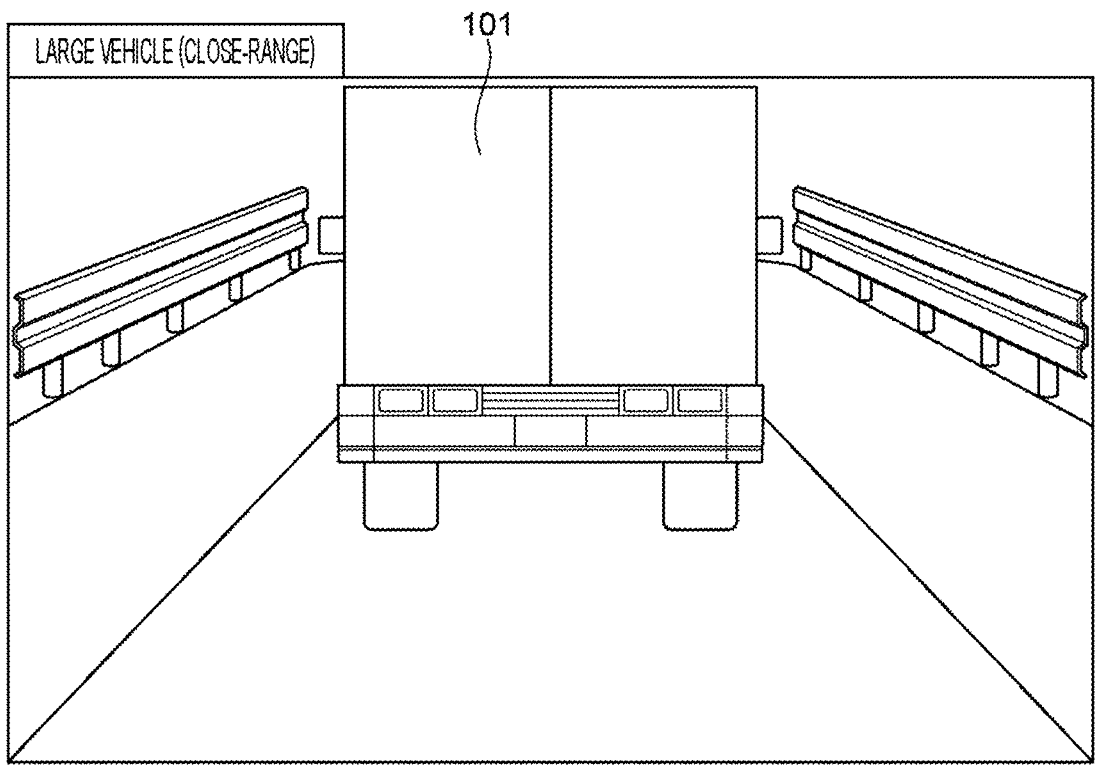
FIG. 9 is an example of a travel scene in which an object is a large vehicle and is at a short range from the ego-vehicle.

FIGS. 7 to 9 illustrate travel scenes in which the object 101 is a large vehicle.

In the travel scene of FIG. 7, the object 101 is far from the ego-vehicle, the range in which the user can visually recognize the front and the surroundings is large, and the range that is blocked by the object 101 and cannot be visually recognized is small. Similarly, in the travel scene of FIG. 8, the object 101 is approaching the ego-vehicle, but the range that can be visually recognized by the user is large.

However, in the travel scene of FIG. 9, the object 101 is nearer to the ego-vehicle than in the travel scene of FIG. 8, the range that can be visually recognized by the user is small, and the range that can be visually recognized by the object 101 is small.

That is, in a case where the object 101 is a large vehicle such as a bus or a truck and the distance between the ego-vehicle and the object 101 is short, it is difficult for the user to check the front and the surroundings of the object 101 ahead. Therefore, it is difficult for the user to visually grasp the situation in front and in the surroundings, and the user drives in a state where it is difficult to predict the travel circumstances. Therefore, the level of fear which the user is made to feel is low in the travel scenes of FIGS. 7 and 8, but the level of fear which the user is made to feel is high in the travel scene of FIG. 9.

In FIGS. 4 to 9 (FIGS. 4 and 7, FIGS. 5 and 8, and FIGS. 6 and 9), the inter-vehicle distance between the object 101 and the ego-vehicle is the same. Therefore, a travel scene in which the travel situation is difficult to predict according to the size of the object 101, even with the same inter-vehicle distance, arises.

In addition, depending on the speed of the ego-vehicle, cases such as a case where the ego-vehicle cannot respond to a sudden change due to a travel situation in front of the object 101 such as sudden braking of the preceding vehicle, and thus the ego-vehicle collides with the object 101, may be a cause for concern.

Therefore, an appropriate target inter-vehicle distance is desirably used in accordance with the travel scenes of FIGS. 4 to 9. In the present embodiment, based on such a principle, an appropriate target inter-vehicle distance from the preceding vehicle is secured according to the level of fear the driver is made to feel due to the travel lane being blocked by the preceding vehicle, and thus the level of fear of the driver is reduced. Hereinafter, an embodiment including a control method in the above-described travel scene will be described in detail.

Figure 10:
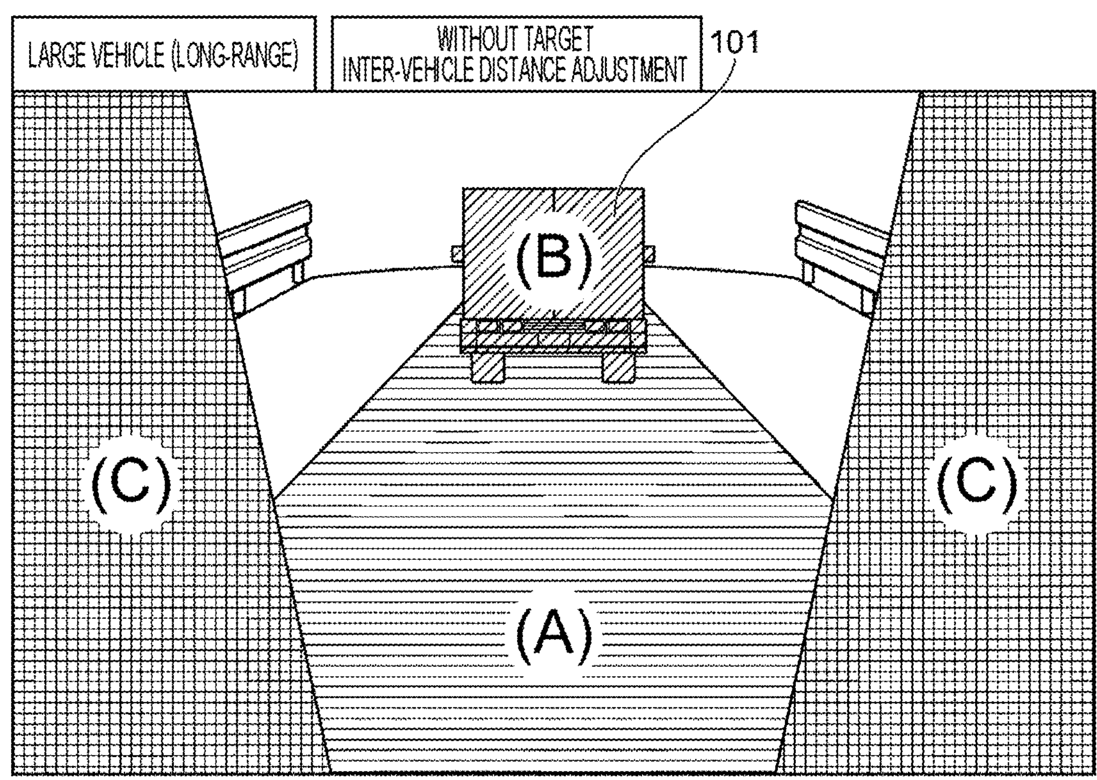
FIG. 10 is an example of a travel scene pertaining to FIG. 7 to which the present embodiment is applied (a default value is used as a target inter-vehicle distance).
Figure 11:
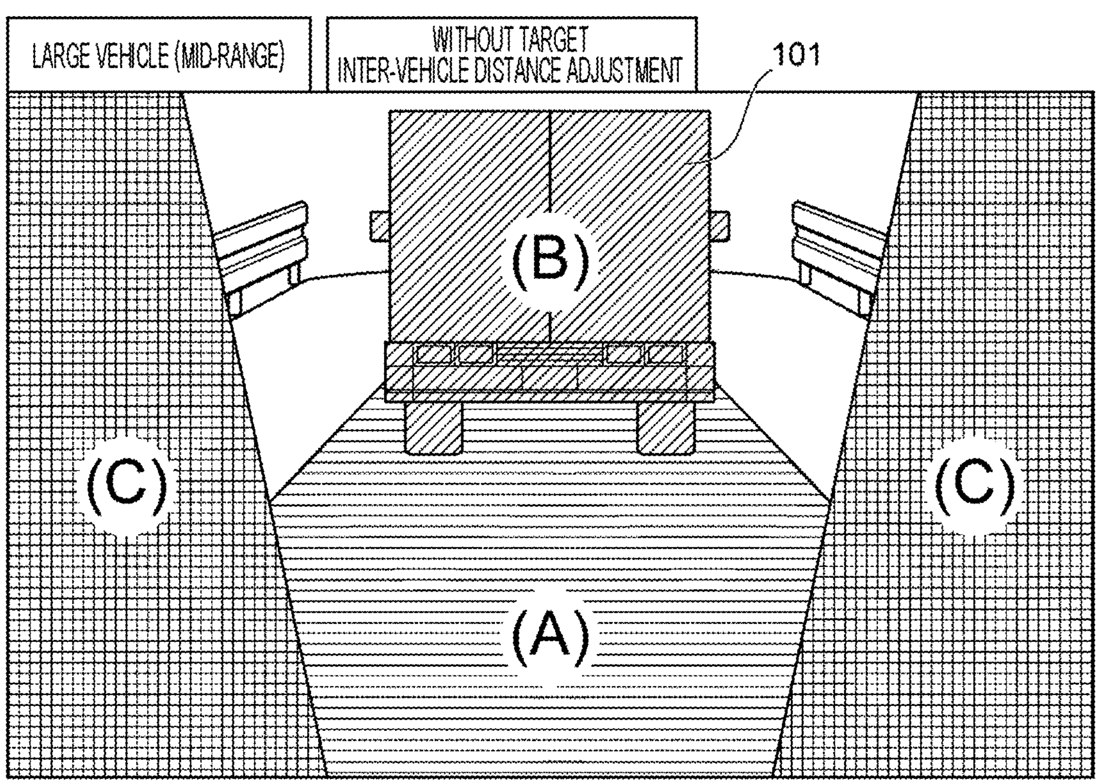
FIG. 11 is an example of a travel scene pertaining to FIG. 8 to which the present embodiment is applied (a default value is used as the target inter-vehicle distance).
Figure 12:
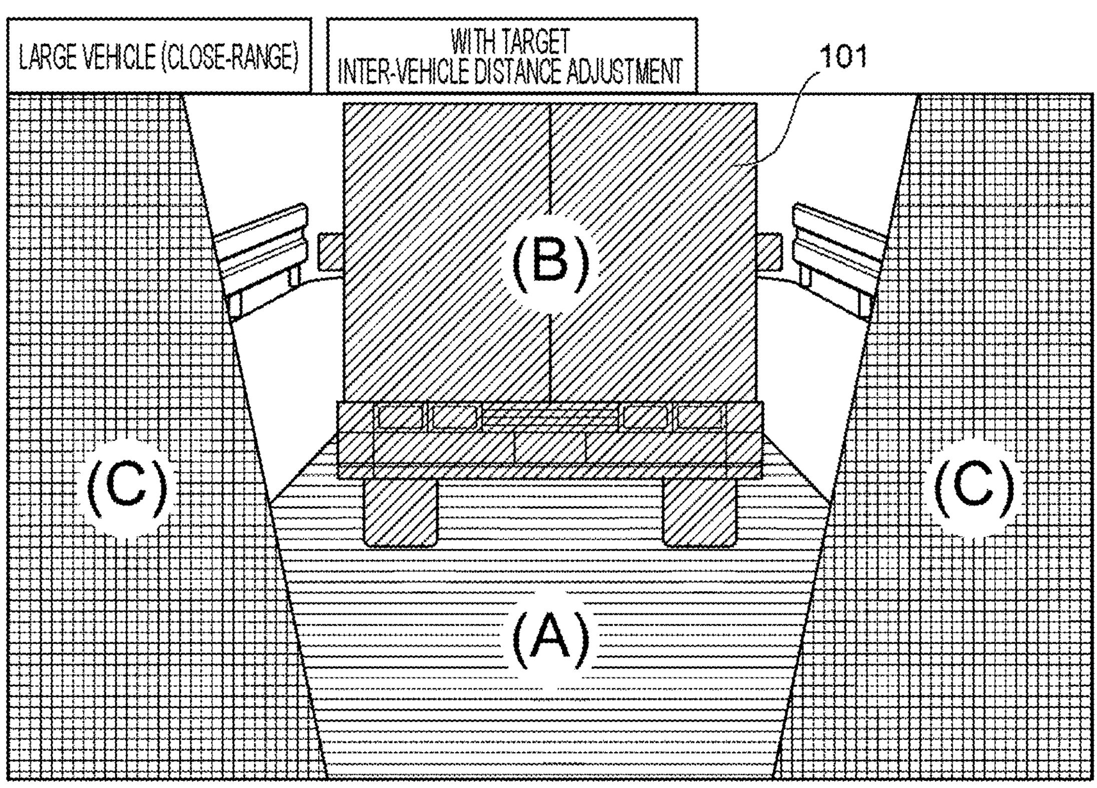
FIG. 12 is an example of a travel scene pertaining to FIG. 9 to which the present embodiment is applied (a maximum target inter-vehicle distance is used as the target inter-vehicle distance).

FIGS. 10 to 12 are explanatory diagrams of a scene in which, as an example of a travel scene related to the vehicle control system according to the present embodiment, the target inter-vehicle distance of the ego-vehicle is adjusted according to the size of the travel lane area (A) blocked by the preceding vehicle blocking area (B) and the viewing angle blocking area (C), from the area A of the lane on which the ego-vehicle travels (hereinafter referred to as the travel lane area (A)) filled with horizontal stripes, the area in which the user view or viewing angle is blocked by the object 101 (hereinafter referred to as the preceding vehicle blocking area (B)) filled with diagonal stripes, and the area in which the user view or viewing angle is blocked by the viewing angle (hereinafter referred to as the viewing angle blocking area (C)), which is calculated from the speed of the ego-vehicle and filled with a check pattern.

The travel lane area (A) and the preceding vehicle blocking area (B) can be obtained by (the road surface detection unit 82 of) the front image calculation unit 62 and (the object detection unit 81 of) the front object calculation unit 61 of the vehicle control device 60 from information detected by the mid-range distance sensors 22 of a millimeter wave radar or the like and the long-range distance sensor 25 of a stereo camera or the like, which are included in the ego-vehicle.

The viewing angle blocking area (C) can be obtained by the viewing angle calculation unit 63 of the vehicle control device 60 from information detected by the wheel sensor 28 included in the ego-vehicle.

Feature points present in the direction of travel of the ego-vehicle (on the image data) are detected and the travel lane area (A) can be calculated from an area enclosed by the feature points. The outline of the object 101 is detected and the preceding vehicle blocking area (B) can be calculated from the area enclosed by the outline. The viewing angle blocking area (C) can be calculated on the basis of a blocking rate resulting from a viewing angle set in light of the speed of the ego-vehicle. Note that, as is generally known, because it is recognized that the field of view of a human being narrows according to their own movement speed, the viewing angle blocking area (C) is calculated to grow wider (stepwise or continuously) as the vehicle speed becomes higher as described above (and to grow narrower as the vehicle speed becomes lower) so as to conform to the characteristics of human cognition.

The travel lane area (A), which serves for performing determinations according to the travel scene, can be obtained by (the road surface update unit 84 of) the target inter-vehicle distance calculation unit 65 of the vehicle control device 60, from the above-described travel lane area (A), the preceding vehicle blocking area (B), and the viewing angle blocking area (C).

Travel scenes will be described in detail below.

FIGS. 10 to 12 are examples of imaging processing to which the vehicle control system according to the present embodiment is applied in the travel scenes of FIGS. 7 to 9. In addition, in FIGS. 10 to 12, common to each travel scene is the fact that the ego-vehicle is assumed to have a high vehicle speed and the object 101 is assumed to be a large vehicle.

First, FIG. 10 will be described. As can be seen from FIG. 10, in the relationships between the travel lane area (A), the preceding vehicle blocking area (B), and the viewing angle blocking area (C), the user can visually grasp the situation in front and in the surroundings from the size of the travel lane area (A), and therefore it can be determined that the level of fear is low.

Next, FIG. 11 will be described. As can be seen from FIG. 11, in the relationships between the travel lane area (A), the preceding vehicle blocking area (B), and the viewing angle blocking area (C), the travel lane area (A) in FIG. 11 is less than that in FIG. 10 in light of the size of the travel lane area (A), but the user can visually grasp the situation in front and in the surroundings, and therefore it can be determined that the level of fear is low.

Next, FIG. 12 will be described. As can be seen from FIG. 12, in the relationships between the travel lane area (A), the preceding vehicle blocking area (B), and the viewing angle blocking area (C), the travel lane area (A) in FIG. 12 is less than that in FIG. 11 in light of the size of the travel lane area (A), and it is difficult for the user to visually grasp the situation in front and in the surroundings, and therefore it can be determined that the level of fear is high.

As described above, in FIGS. 10 and 11, because the travel lane area (A) is large, it is determined that the level of fear is low, and the default value set in advance by the vehicle control system according to the present embodiment is used as the target inter-vehicle distance. The target inter-vehicle distance referred to herein may be a distance indicated in units of length, or may be an inter-vehicle time, which is the time required for the ego-vehicle to pass through a position through which the preceding vehicle has passed. The present embodiment is applicable in either case.

In FIG. 12, because the travel lane area (A) is small, it is determined that the level of fear is high, and the maximum target inter-vehicle distance set in advance by the vehicle control system according to the present embodiment is used as the target inter-vehicle distance.

As described above, the level of fear that the user is made to feel is calculated from the size of the travel lane area (A) blocked by (mirroring) the preceding vehicle blocking area (B) and the viewing angle blocking area (C), and the target inter-vehicle distance is changed (changed using the default value and the maximum target inter-vehicle distance) according to the level of fear, and thus the vehicle can be controlled at an inter-vehicle distance suitable for each travel scene.

As described above, a travel scene in which the ego-vehicle 100 travels at a high vehicle speed and the object 101 is a large vehicle has been described.

Next, a travel scene in which the ego-vehicle 100 travels at a low vehicle speed or the object 101 is an ordinary vehicle will be described.

Figure 13:
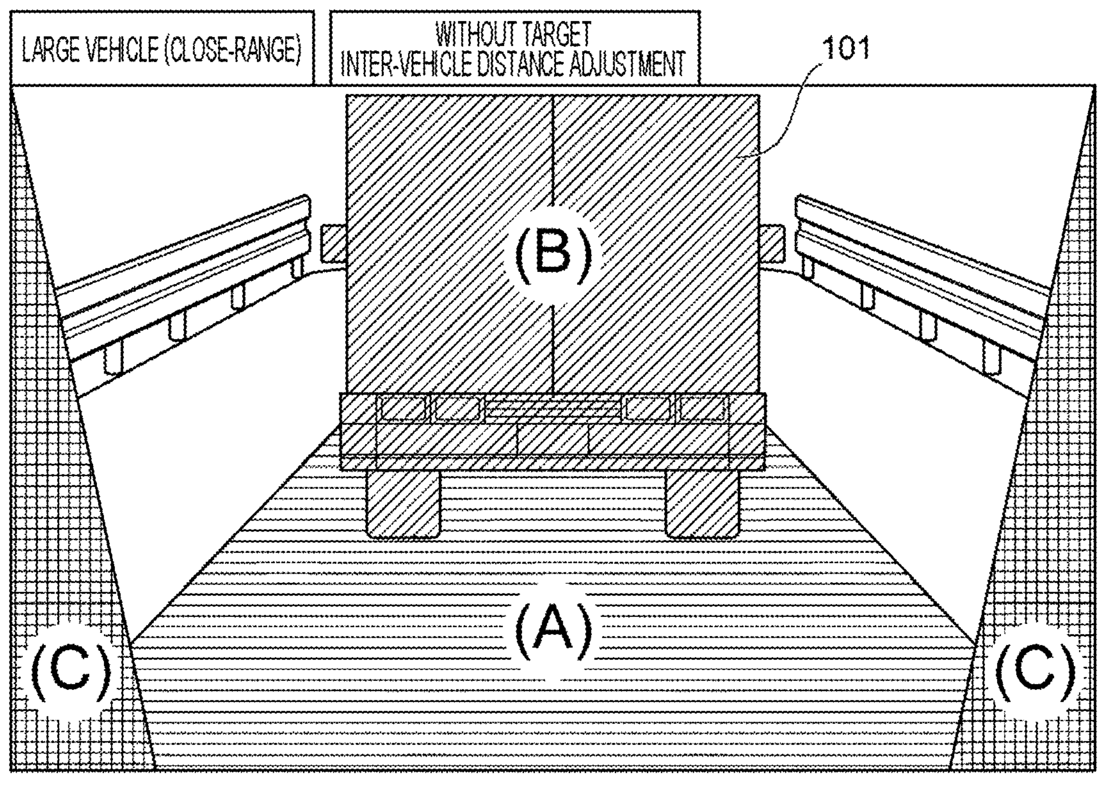
FIG. 13 is an example of a travel scene pertaining to FIG. 9 to which the present embodiment is applied (the ego-vehicle is traveling at low speed) (a default value is used as the target inter-vehicle distance).

First, FIG. 13 will be described. FIG. 13 is an example of imaging processing to which the vehicle control system according to the present embodiment is applied in the travel scene of FIG. 9. In FIG. 13, the speed of the ego-vehicle is low, and the object 101 is a large vehicle.

As can be seen from FIG. 13, in the relationships between the travel lane area (A), the preceding vehicle blocking area (B), and the viewing angle blocking area (C), because the ego-vehicle is traveling at a low vehicle speed and thus the viewing angle is wide, the size of the viewing angle blocking area (C) is smaller (narrower) than that in FIG. 12. Therefore, from the size of the travel lane area (A), the user can visually grasp the situation in front and in the surroundings, and therefore it can be determined that the level of fear is low.

Figure 14:
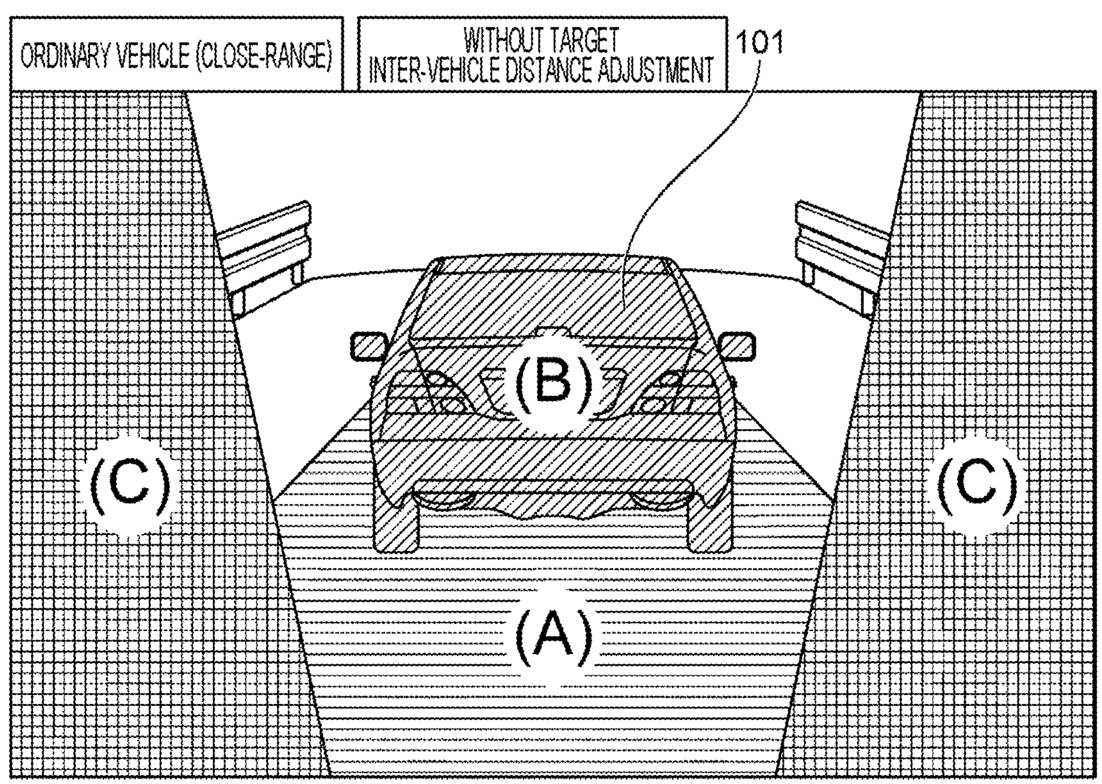
FIG. 14 is an example of a travel scene pertaining to FIG. 6 to which the present embodiment is applied (a default value is used as the target inter-vehicle distance).

Next, FIG. 14 will be described. FIG. 14 is an example of imaging processing to which the vehicle control system according to the present embodiment is applied in the travel scene of FIG. 6. In FIG. 14, the speed of the ego-vehicle is high, and the object 101 is an ordinary vehicle.

As can be seen from FIG. 14, in the relationships between the travel lane area (A), the preceding vehicle blocking area (B), and the viewing angle blocking area (C), because the object 101 is an ordinary vehicle, the preceding vehicle blocking area (B) is less than that of the large vehicle in FIG. 12. Therefore, from the size of the travel lane area (A), the user can visually grasp the situation in front and in the surroundings, and therefore it can be determined that the level of fear is low.

As described above, in FIGS. 13 and 14, because the area blocked by the viewing angle blocking area (C) and the preceding vehicle blocking area (B) is small and the travel lane area (A) is large, it is determined that the level of fear is low, and the default value set in advance by the vehicle control system according to the present embodiment is used as the target inter-vehicle distance.

As described above, in a case where the speed of the ego-vehicle 100 is low, or when the object 101 is an ordinary vehicle or the like, in other words, at the time of traffic congestion or when the preceding vehicle is an ordinary vehicle or a two-wheeled vehicle, the user can visually grasp the state of the front and the surroundings, and therefore it can be determined that the level of fear is low.

Therefore, by calculating the level of fear corresponding to the size of the object 101 and the speed of the ego-vehicle 100, it is possible to perform vehicle control without inadvertently changing the target inter-vehicle distance.

Figure 15:
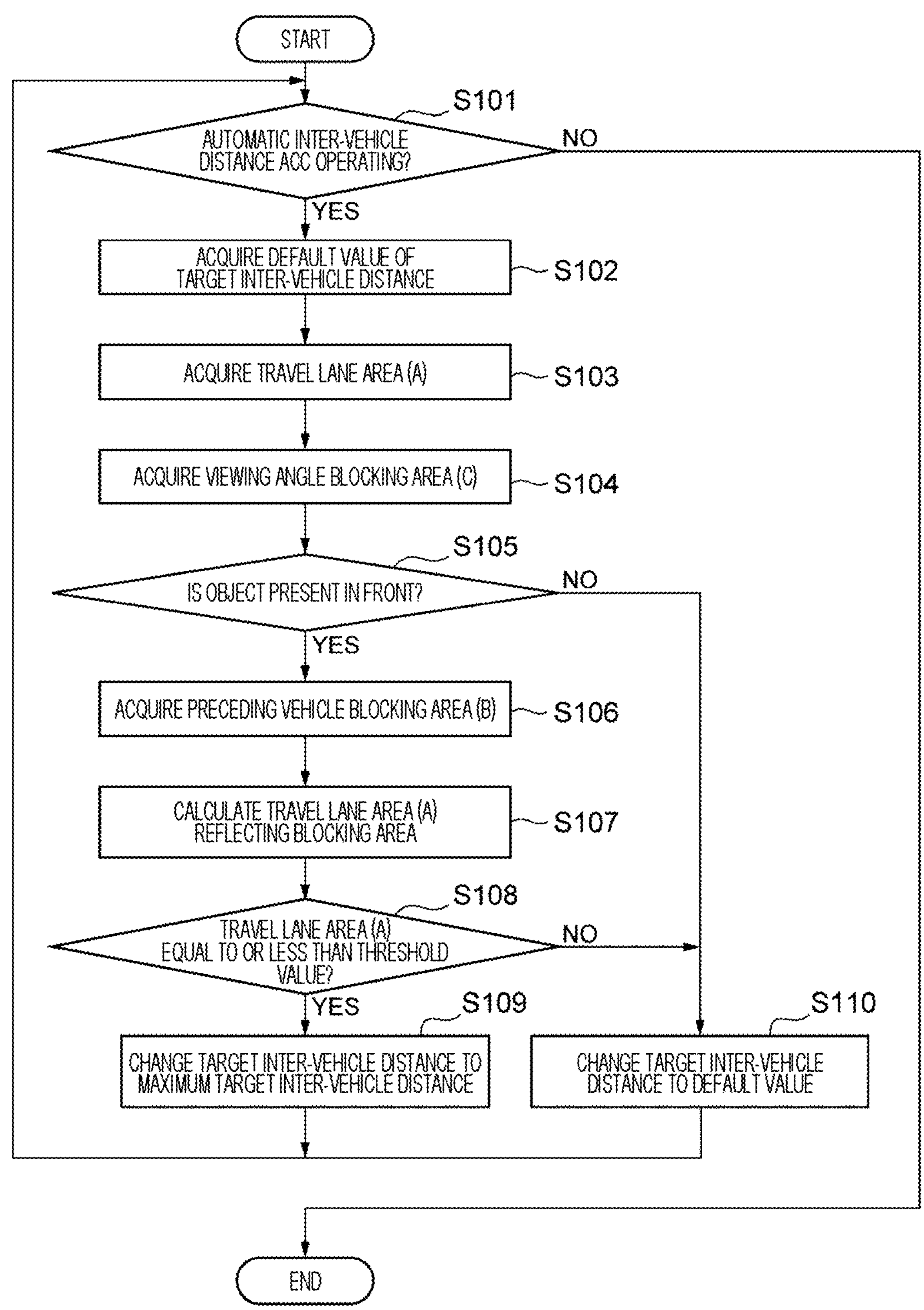
FIG. 15 is an example of a flowchart related to the vehicle control system according to the present embodiment.

Next, a process outline of the present embodiment will be described. FIG. 15 is a flowchart of processing executed by the vehicle control system (in particular, the target inter-vehicle distance calculation unit 65 of the vehicle control device 60) according to the present embodiment.

In step S101, the operating state of the automatic inter-vehicle distance ACC which is the vehicle control system according to the present embodiment is determined from the information of the inter-vehicle distance mode determination unit 64. In this step, the automatic inter-vehicle distance ACC can be started/released by the user operating the input switch unit 29. In a case where the automatic inter-vehicle distance ACC is operating (YES), the process advances to step S102. In a case where the automatic inter-vehicle distance ACC is not operating (NO), the process is ended.

In step S102, a default value of the target inter-vehicle distance in the automatic inter-vehicle distance ACC is acquired. In this step, the default value indicates the target inter-vehicle distance to be used in a scene in which the level of fear is low.

In step S103, the travel lane area (A) is acquired from the information of (the road surface detection unit 82 of) the front image calculation unit 62. In this step, as a method for detecting the travel lane area (A), as described above, it is possible to recognize and calculate the travel lane area (A) by utilizing a stereo camera or the like used by the long-range distance sensor 25.

In step S104, the viewing angle blocking area (C) is acquired from the information of the viewing angle calculation unit 63. In this step, as a method for calculating the viewing angle blocking area (C), as described above, the viewing angle blocking area (C) can be calculated by utilizing the wheel speed or the like obtained by the wheel sensor 28.

In step S105, it is determined, from the information of (the object detection unit 81 of) the front object calculation unit 61, whether the object 101 is in front of the ego-vehicle 100. In this step, as a method for detecting the object 101, as described above, the stereo camera used by the long-range distance sensor 25, the millimeter wave radar used by the mid-range distance sensor 22, and the like, can be utilized for recognition.

In a case where the object 101 is present (YES), the process advances to step S106. In a case where the object 101 is not present (NO), the process advances to step S110.

In step S106, the preceding vehicle blocking area (B) of the object 101 is acquired from the information of (the object detection unit 81 of) the front object calculation unit 61. In this step, as a method for calculating the preceding vehicle blocking area (B), as described above, the millimeter wave radar or the like used by the mid-range distance sensor 22 can be used to recognize and calculate the preceding vehicle blocking area (B).

In step S107, the travel lane area (A) mirroring the viewing angle blocking area (C) acquired in step S104 and the preceding vehicle blocking area (B) acquired in step S106 is calculated (updated) with respect to the travel lane area (A) acquired in step S103.

In step S108, it is determined whether or not the travel lane area (A) calculated (updated) in step S107 is equal to or less than a threshold value set in the automatic inter-vehicle distance ACC. In this step, the threshold value is the size of the travel lane area (A) set on the basis of the level of fear the user is made to feel. In a case where the travel lane area (A) is equal to or less than the threshold value (YES), the process advances to step S109. In a case where the travel lane area (A) is greater than the threshold value (NO), the process advances to step S110.

In step S109, the target inter-vehicle distance of the automatic inter-vehicle distance ACC is changed to the maximum target inter-vehicle distance. When the target inter-vehicle distance is to be changed, the warning device 41, which is a liquid crystal display or a speaker, is used to notify the user of the change in the target inter-vehicle distance. After this step, the process returns to step S101.

In step S110, the target inter-vehicle distance of the automatic inter-vehicle distance ACC is changed to the default value. That is, in a case where the target inter-vehicle distance is not adjusted on the basis of the travel lane area (A), a default value is used as the target inter-vehicle distance of the automatic inter-vehicle distance ACC. When the target inter-vehicle distance is to be changed, the warning device 41, which is a liquid crystal display or a speaker, or the like, is used to notify the user of the change in the target inter-vehicle distance. After this step, the process returns to step S101.

The steps up to step S107 in FIG. 15 are executed by the road surface update unit 84, and steps S108 to S110 in FIG. 15 are executed by the target inter-vehicle distance adjustment unit 85 and the notification controller 86.

According to the present embodiment described above, by using the automatic inter-vehicle distance ACC which is the vehicle control system according to the present embodiment, the level of fear the user is made to feel is calculated from the size of the travel lane area (A) blocked by (mirroring) the preceding vehicle blocking area (B) and the viewing angle blocking area (C), and the target inter-vehicle distance is changed (changed by the default value and the maximum target inter-vehicle distance) according to the level of fear, and thus the vehicle can be controlled at the inter-vehicle distance suitable for each travel scene.

Figure 16:
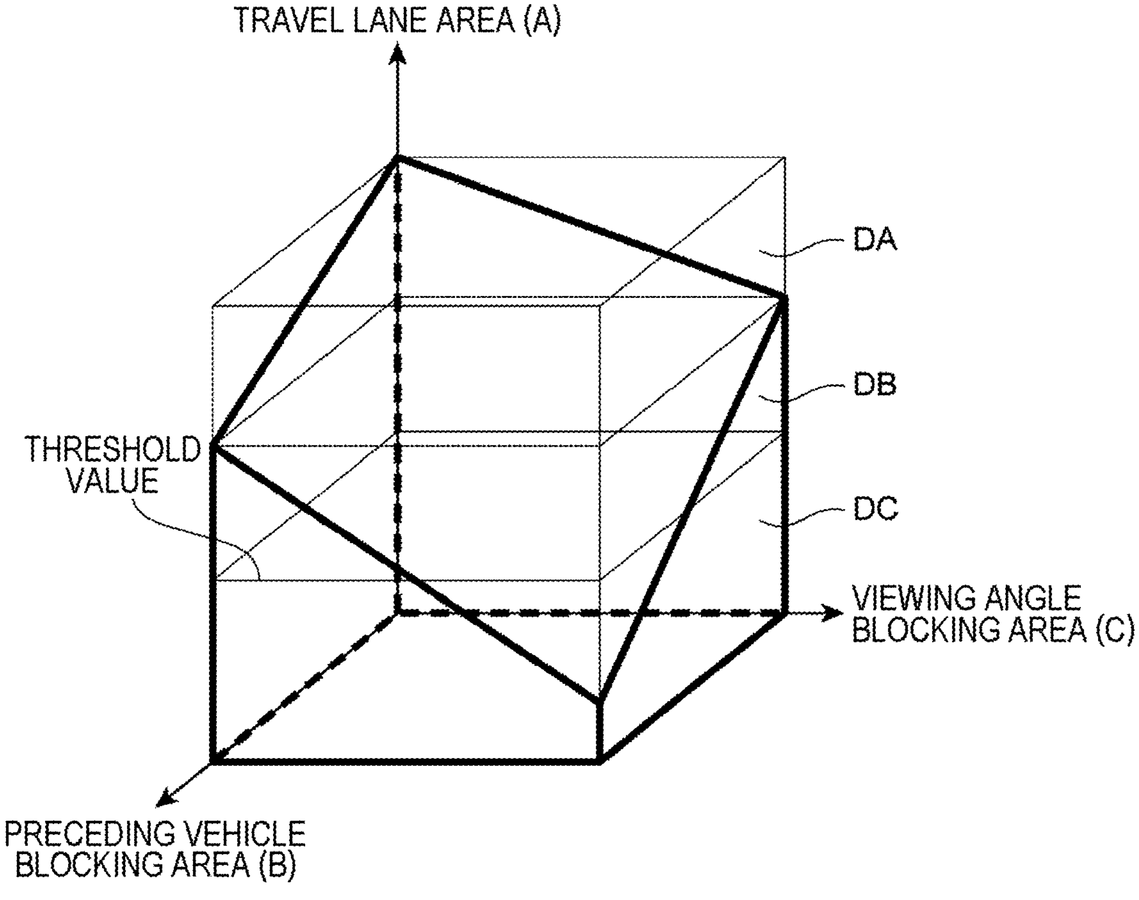
FIG. 16 is an example of a three-dimensional map for calculating the target inter-vehicle distance according to the present embodiment.

The travel lane area (A) calculated (updated) in step S107 described above can be calculated by, for example, the three-dimensional map illustrated in FIG. 16.

In the three-dimensional map in FIG. 16, based on a right-handed three-dimensional coordinate system, the X-axis indicates the size of the preceding vehicle blocking area (B), the Y-axis indicates the size of the viewing angle blocking area (C), and the Z-axis indicates the size of the travel lane area (A). For the above three axis elements, the area of an object increases as the element advances in the positive direction, which is the arrow direction. Hereinafter, the changes in FIG. 16 for each travel scene will be described.

The threshold value in FIG. 16 is equal to or greater than the threshold value in the positive direction and equal to or less than the threshold value in the negative direction with respect to the travel lane area (A) indicated by the Z-axis.

In the travel lane area (A) of FIG. 16, the upper level DA represents a state where the preceding vehicle blocking area (B) is large but the viewing angle blocking area (C) is extremely small, or where the preceding vehicle blocking area (B) is extremely small but the viewing angle blocking area (C) is large. That is, the situation is a situation where the object 101 has the size of an ordinary vehicle to a large vehicle and is in front of the travel lane of the ego-vehicle 100, but the ego-vehicle 100 is in a stopped state, or a situation in which the ego-vehicle 100 is traveling in a low speed to high speed range, but the object 101 is not present.

In the above travel scene, because the size of the travel lane area (A) calculated by mirroring the preceding vehicle blocking area (B) and the viewing angle blocking area (C) is greater than a threshold value, the level of fear the user is made to feel is low.

In the travel lane area (A) of FIG. 16, the middle level DB represents a state where the preceding vehicle blocking area (B) is large but the viewing angle blocking area (C) is small, or where the preceding vehicle blocking area (B) is small but the viewing angle blocking area (C) is large. That is, the size of the object 101 is a large vehicle and is in front of the travel lane of the ego-vehicle 100, but the ego-vehicle 100 is traveling in a low-speed to medium-speed range, or, although the ego-vehicle 100 is traveling in a high speed range, the size of the object 101 is an ordinary vehicle and is in front of the travel lane of the ego-vehicle 100.

In the above travel scene, because the size of the travel lane area (A) calculated by mirroring the preceding vehicle blocking area (B) and the viewing angle blocking area (C) is greater than a threshold value, the level of fear the user is made to feel is low.

In the travel lane area (A) of FIG. 16, the lower level DC represents a state in which the preceding vehicle blocking area (B) is large and the viewing angle blocking area (C) is large. That is, the size of the object 101 is a large vehicle and is in front of the travel lane of the ego-vehicle 100, and the ego-vehicle 100 is traveling in a high-speed range.

In the travel scene described above, because the size of the travel lane area (A) calculated by mirroring the preceding vehicle blocking area (B) and the viewing angle blocking area (C) is equal to or less than the threshold value, the level of fear the user is made to feel is high.

Therefore, from the size the travel lane area (A) mirroring the preceding vehicle blocking area (B) and the viewing angle blocking area (C) that cannot be visually recognized by the user, it is determined that the level of fear the user is made to feel is low in a case where the travel lane area (A) is greater than the threshold value, and that the level of fear the user is made to feel is high in a case where the travel lane area (A) is equal to or less than the threshold value, and thus the vehicle can be controlled using the inter-vehicle distance as perceived by the user.

In addition, in a case where the size of the travel lane area (A) is equal to or less than the threshold value, control is performed to extend the inter-vehicle distance so that the size of the travel lane area (A) becomes greater than the threshold value.

The method for calculating the level of fear according to the present embodiment is not limited to the three-dimensional map and presentation method.

For example, the target inter-vehicle distance may be changed using the following calculation formula (1) when the calculated value LL is equal to or greater than the threshold value.

Calculation formula (1): calculated value LL=preceding vehicle blocking area (B)÷{travel lane area (A)−viewing angle blocking area (C)+preceding vehicle blocking area (B)}

The above calculation formula (1) is a calculation formula for calculating the ratio of the preceding vehicle blocking area (B) with respect to the travel lane area (A) mirroring the viewing angle blocking area (C). The larger the calculated value LL, the larger the proportion occupied by the preceding vehicle blocking area (B), that is, the smaller the travel lane area (A), the smaller the calculated value LL, the smaller the proportion occupied by the preceding vehicle blocking area (B), that is, the larger the travel lane area (A).

In a case where the calculated value LL is equal to or greater than the threshold value, the target inter-vehicle distance is adjusted so that the preceding vehicle blocking area (B) becomes small, that is, the inter-vehicle distance between the object 101 and the ego-vehicle 100 is extended, and thus it is possible to perform control while tracking the preceding vehicle at the inter-vehicle distance which provides a reduction in the level of fear the user is made to feel.

In the three-dimensional map of FIG. 16, a numerical value set in advance by the vehicle control system may be used, or the user may arbitrarily change the numerical value. Regarding the method set by the user, for example, a three-dimensional map of the target vehicle speed may be displayed on a liquid crystal display mounted on the vehicle, the input switch unit 29 may be used to change the numerical value of the target inter-vehicle distance corresponding to the size of the travel lane area (A) for calculating the level of fear and to change the default value. In addition, a plurality of three-dimensional maps may be managed, and, for each user, a numerical value of the target inter-vehicle distance corresponding to the size of the travel lane area (A) for calculating the level of fear and a default value may be registered in the vehicle control system of the present embodiment.

As described above, because the numerical value of the target inter-vehicle distance or the default value can be arbitrarily set, it is possible to use a numerical value as perceived by the user.

Note that, in a general preceding vehicle-tracking travel device, the driver can set a desired inter-vehicle distance from a plurality of stages. However, in the present embodiment, when the default value of the target inter-vehicle distance is applied only in the direction of extension, the default value of the target inter-vehicle distance does not become a near-vehicle distance not intended by the driver. Therefore, it is preferable to adjust the target inter-vehicle distance not only in the embodiment according to FIG. 16 but also in the direction of extension.

In addition, when the user arbitrarily changes the numerical value, as described above, the default value of the target inter-vehicle distance can be changed only in the direction of extension.

<Modification>

Because there are some modifications in the above-described embodiment, the modifications will be described below.

<<Modified Example 1>>

Figure 17:
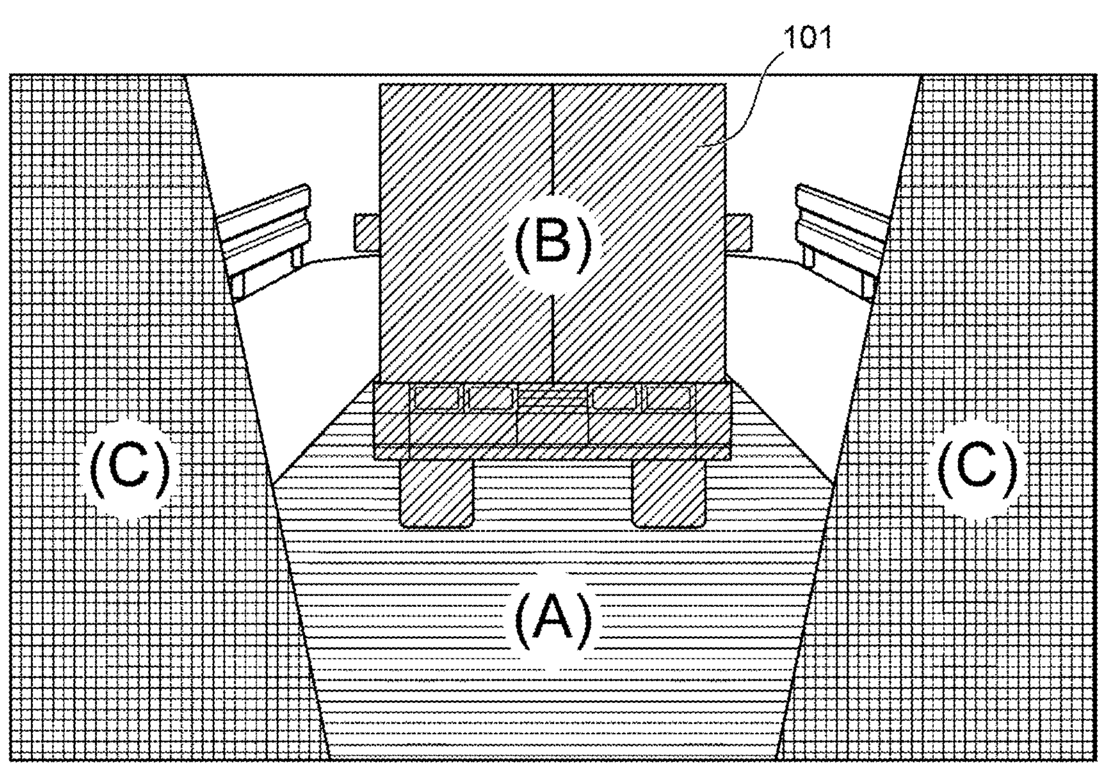
FIG. 17 is an example of a travel scene in which an object having a large vehicle height and a small vehicle width is present in a Modified example 1.

In the above-described embodiment, in the target inter-vehicle distance adjustment unit 85, the level of fear is calculated from the size of the area in which the preceding vehicle blocking area (B) and the viewing angle blocking area (C) that cannot be visually recognized by the user are mirrored in the travel lane area (A) that can be visually recognized by the user, and the vehicle is controlled using the target inter-vehicle distance as perceived by the user. However, as shown in FIG. 17, in a case where the object 101 is a vehicle having a small vehicle width and a large vehicle height, such as a compact truck or a passenger car having a large vehicle height such as a minivan or an SUV, because the travel lane area (A) is greater than the threshold value as shown in FIG. 14 described above, it is calculated that the level of fear the user is made to feel is small, and a default value is used for the target inter-vehicle distance.

In Modified example 1 described above, because it is difficult for the user to visually recognize the tip of the object 101, the user likely also feels a high level of fear. Therefore, the level of fear calculated by the vehicle control system may be different from the level of fear actually felt by the user.

Therefore, it is possible to further improve the accuracy of the level of fear by considering information on visual recognition in front of the object 101 in addition to the size of the travel lane area (A) that can be visually recognized by the user.

Figure 18:
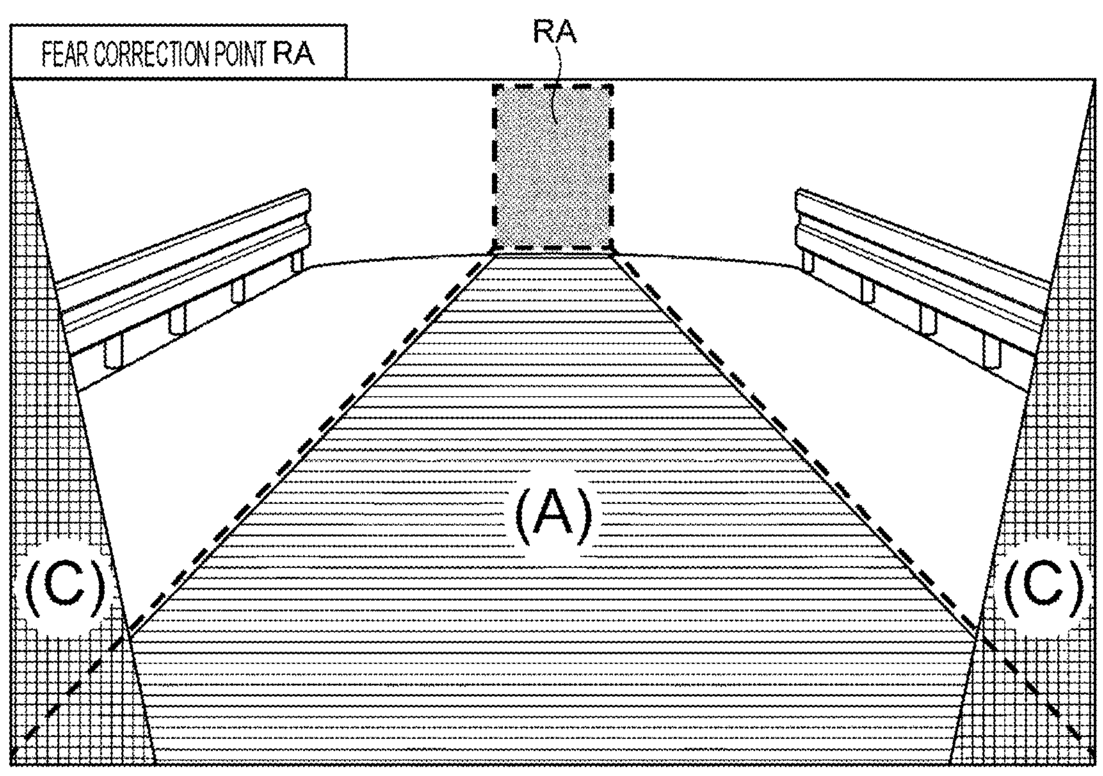
FIG. 18 is an example of a travel scene illustrating a fear correction point RA in Modified example 1.

Therefore, in Modified example 1, as illustrated in FIG. 18, a weighting point (hereinafter described as a fear correction point RA) for correcting the level of fear such as the region RA in the center-top part of the travel lane of the ego-vehicle is provided in advance in the vehicle control system. The fear correction point RA can be implemented, for example, by setting a region on the basis of the tips of the white lines on both sides of the travel lane of the ego-vehicle.

Figure 19:
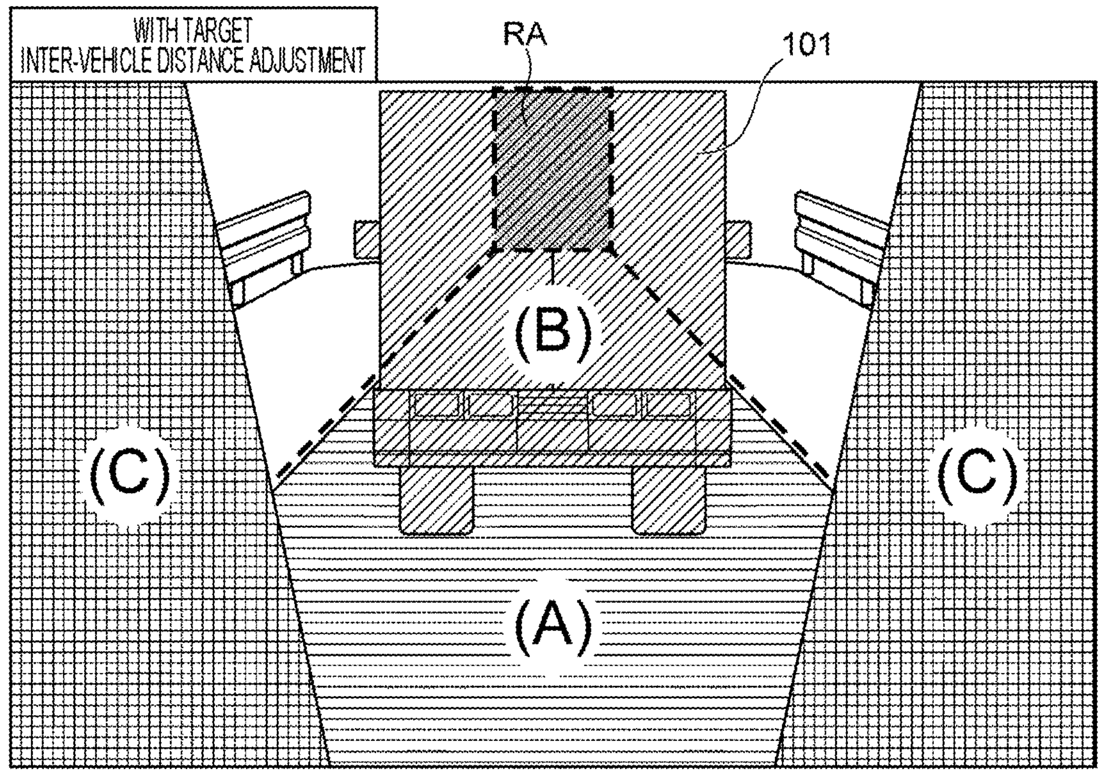
FIG. 19 is an example of a travel scene in which the fear correction point RA in FIG. 18 is applied to FIG. 17 in Modified example 1.

FIG. 19 illustrates an example, pertaining to FIG. 17, in which the fear correction point RA of FIG. 18 is mirrored. As can be seen from FIG. 19, because the object 101 has a large vehicle height, the preceding vehicle blocking area (B) is in the fear correction point RA. Therefore, even when the travel lane area (A) is greater than the threshold value, when the preceding vehicle blocking area (B) is in the fear correction point RA, the level of fear the user is made to feel is corrected (calculated as large), and the maximum target inter-vehicle distance (not the default value) is used as the target inter-vehicle distance.

Figure 20:
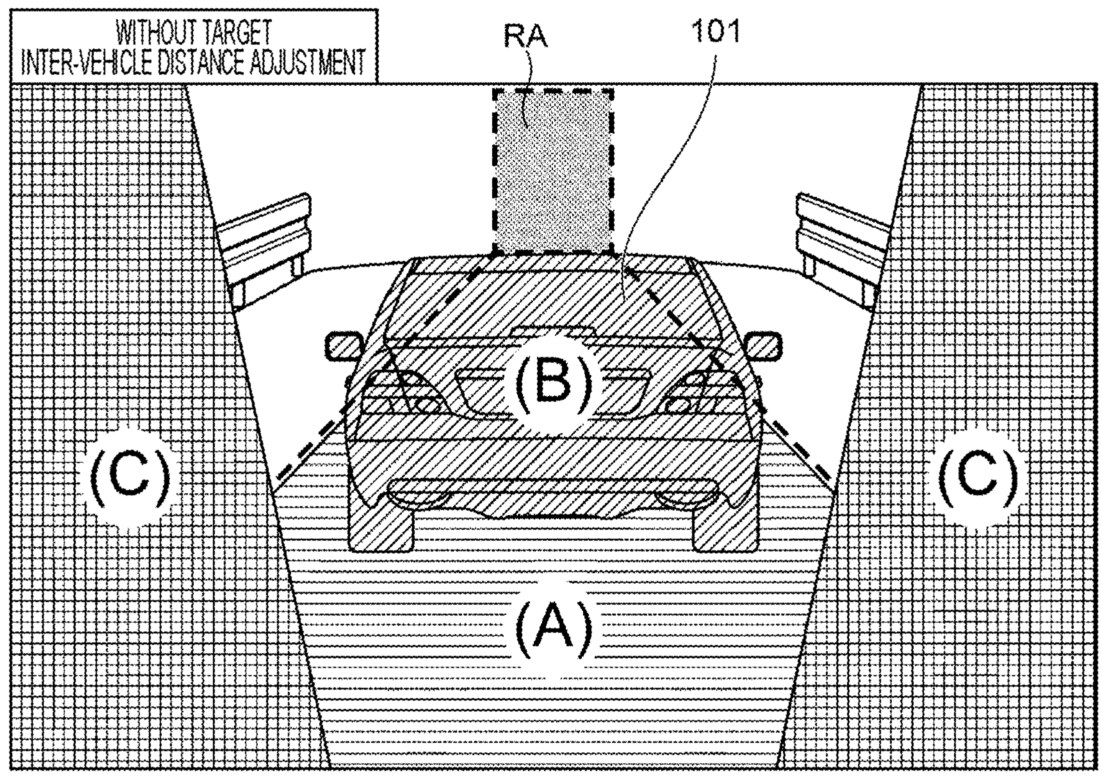
FIG. 20 is an example of a travel scene in which the fear correction point RA is applied to an object having a small vehicle height and a large vehicle width in Modified example 1.

In addition, as illustrated in FIG. 20, in a case where the vehicle width of the object 101 is large and the vehicle height is low as per a sports car, the travel lane area (A) is equal to or less than the threshold value as illustrated in FIG. 12, and therefore the level of fear the user is made to feel is calculated as large, and the maximum target inter-vehicle distance is used as the target inter-vehicle distance.

In the above travel scene, it is easy for the user to visually recognize the object 101 ahead, and the user likely also feels a low level of fear.

Therefore, by using the above-described fear correction point RA, even in a case where the travel lane area (A) is equal to or less than the threshold value, when the preceding vehicle blocking area (B) is not in the fear correction point RA, the level of fear the user is made to feel is corrected (calculated as small), and a default value (not the maximum target inter-vehicle distance) is used as the target inter-vehicle distance.

As described above, in a travel scene where the calculated travel lane area (A) is equal to or less than the threshold value or greater than the threshold value, even in a case where, by using the fear correction point RA set in advance by the vehicle control system, the travel lane area (A) is large as illustrated in FIG. 19, that is, the level of fear calculated by the vehicle control system is small, the level of fear the user is made to feel can be reduced by changing the target inter-vehicle distance to the maximum target inter-vehicle distance in a case where the level of fear is large because of poor visibility of the lane ahead on which the ego-vehicle is traveling due to the object 101 such as a vehicle having a large vehicle height.

In addition, in a case where the travel lane area (A) as illustrated in FIG. 20 is small, that is, even in a case where the level of fear calculated by the vehicle control system is large, in a case where the level of fear is likely to be low due to good visibility of the lane ahead on which the ego-vehicle is traveling because of an object 101 such as a vehicle having a small vehicle height, unnecessary adjustment (extension) of the target inter-vehicle distance can be eliminated by setting the target inter-vehicle distance to the default value.

As described above, the accuracy of the level of fear can be improved using the fear correction point RA set in advance by the vehicle control system, and the vehicle can be controlled using the same sensation as the level of fear the user is made to feel.

Note that the region setting method for the fear correction point RA is not limited to the stereo camera and the like described in the present embodiment. For example, the target inter-vehicle distance may be changed to the maximum target inter-vehicle distance in a case where the object 101 is in a preset region in the vehicle control system by using a millimeter wave radar such as the mid-range distance sensor 22 or a LiDER such as the long-range distance sensor 25.

<<Modified Example 2>>

Figure 21:
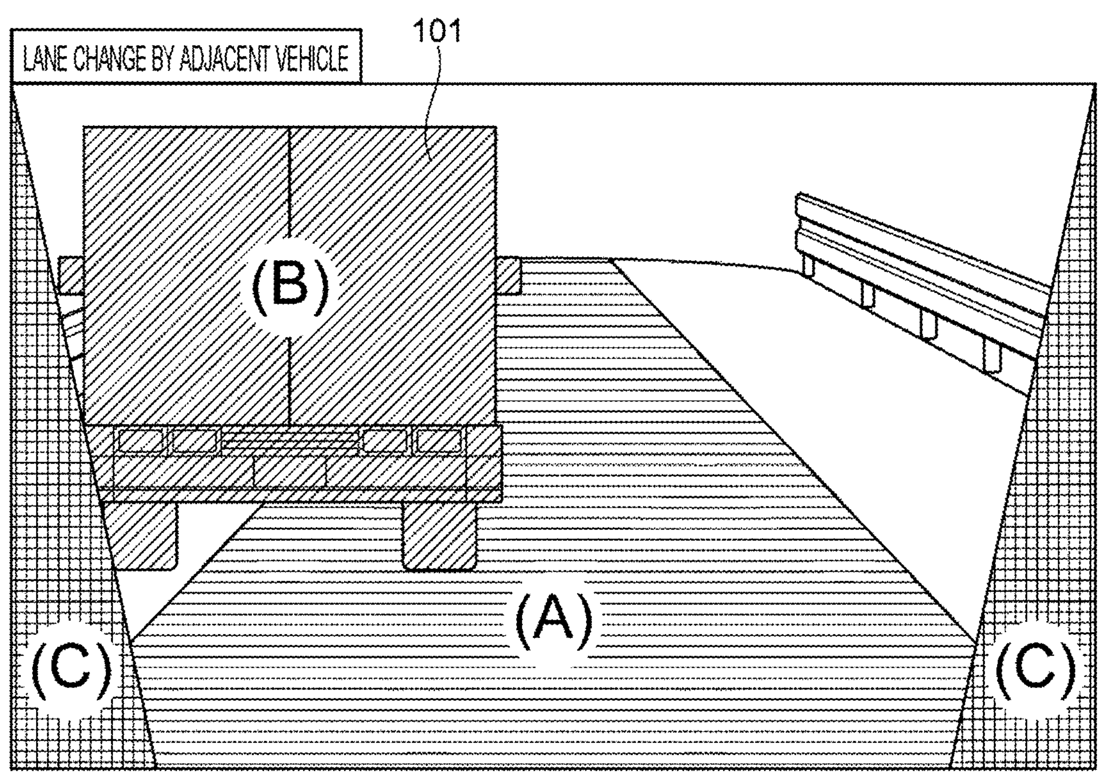
FIG. 21 is an example of a travel scene in which an object traveling in an adjacent lane changes to the travel lane of the ego-vehicle in a Modified example 2.

In the above-described embodiment, in the target inter-vehicle distance adjustment unit 85, the level of fear is calculated from the size of the area in which the preceding vehicle blocking area (B) and the viewing angle blocking area (C) that cannot be visually recognized by the user are mirrored in the travel lane area (A) that can be visually recognized by the user, and the vehicle is controlled using the target inter-vehicle distance as perceived by the user. However, as shown in FIG. 21, in a case where the object 101 starts to change lanes from the adjacent lane to the vicinity of the lane on which the ego-vehicle travels, the travel lane area (A) gradually decreases due to the preceding vehicle blocking area (B). That is, immediately after the object 101 starts the lane change, because the travel lane area (A) is greater than the threshold value, the level of fear the user is made to feel is calculated as small, and the default value is used as the target inter-vehicle distance.

In Modified example 2 described above, the user also likely feels a high level of fear because the object 101 has started to change lanes in the vicinity of the travel lane of the ego-vehicle.

In addition, in a case where the object 101 finishes changing lanes from the adjacent lane to the vicinity of the lane in which the ego-vehicle is traveling, it is calculated that, due to the preceding vehicle blocking area (B), the travel lane area (A) becomes equal to or less than the threshold value and the level of fear the user is made to feel is high, and thus the maximum target inter-vehicle distance is used as the target inter-vehicle distance.

In Modified example 2 described above, the target inter-vehicle distance is changed to the maximum target inter-vehicle distance at point close to where the lane change of the object 101 ends in the vicinity of the travel lane of the ego-vehicle, and thus the user likely also feels that the responsiveness is poor and a lack of convenience. Therefore, the level of fear calculated by the vehicle control system is, on occasion, different from the level of fear actually felt by the user, and it is desirable to change the target inter-vehicle distance to the maximum target inter-vehicle distance immediately after the object 101 starts the lane change to the vicinity of the travel lane of the ego-vehicle.

Therefore, it is possible to further improve the accuracy of the level of fear by taking into account vehicle behavior such as a lane change of the object 101, in addition to the size of the travel lane area (A) which is visually recognizable by the user.

Figure 22:
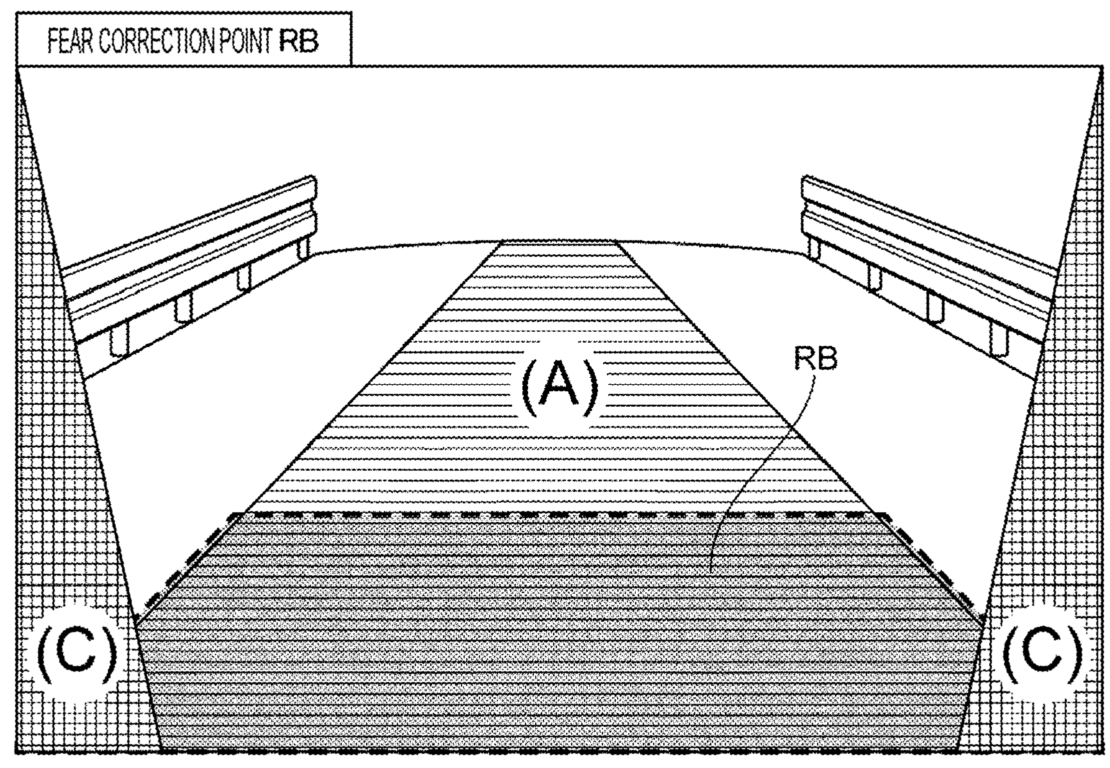
FIG. 22 is an example of a travel scene illustrating a fear correction point RB in Modified example 2.

Therefore, in Modified example 2, as illustrated in FIG. 22, a weighting point (hereinafter described as a fear correction point RB) for correcting the level of fear such as a region RB existing in the lower part of the travel lane of the ego-vehicle is provided in the vehicle control system in advance. The fear correction point RB can be realized, for example, by setting the region on the basis of the vicinity of the white lines on both sides of the travel lane of the ego-vehicle.

Figure 23:
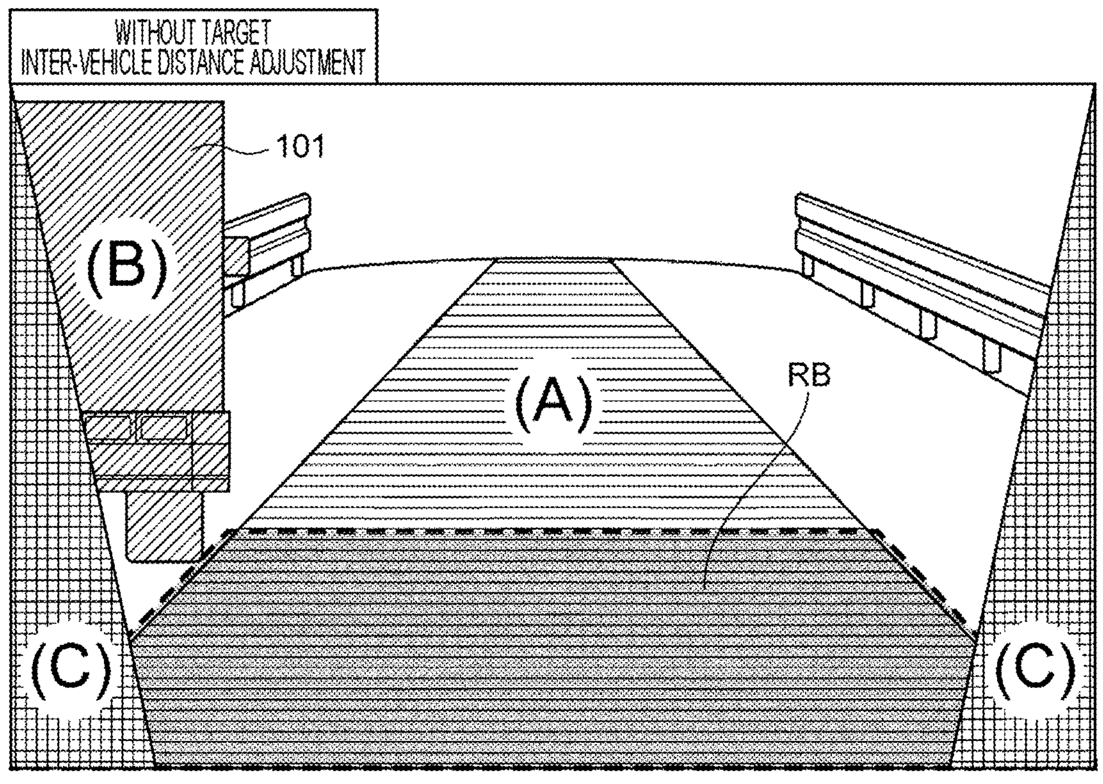
FIG. 23 is an example of a travel scene in which the fear correction point RB in FIG. 22 is applied to the start of the object lane change in Modified example 2.
Figure 24:
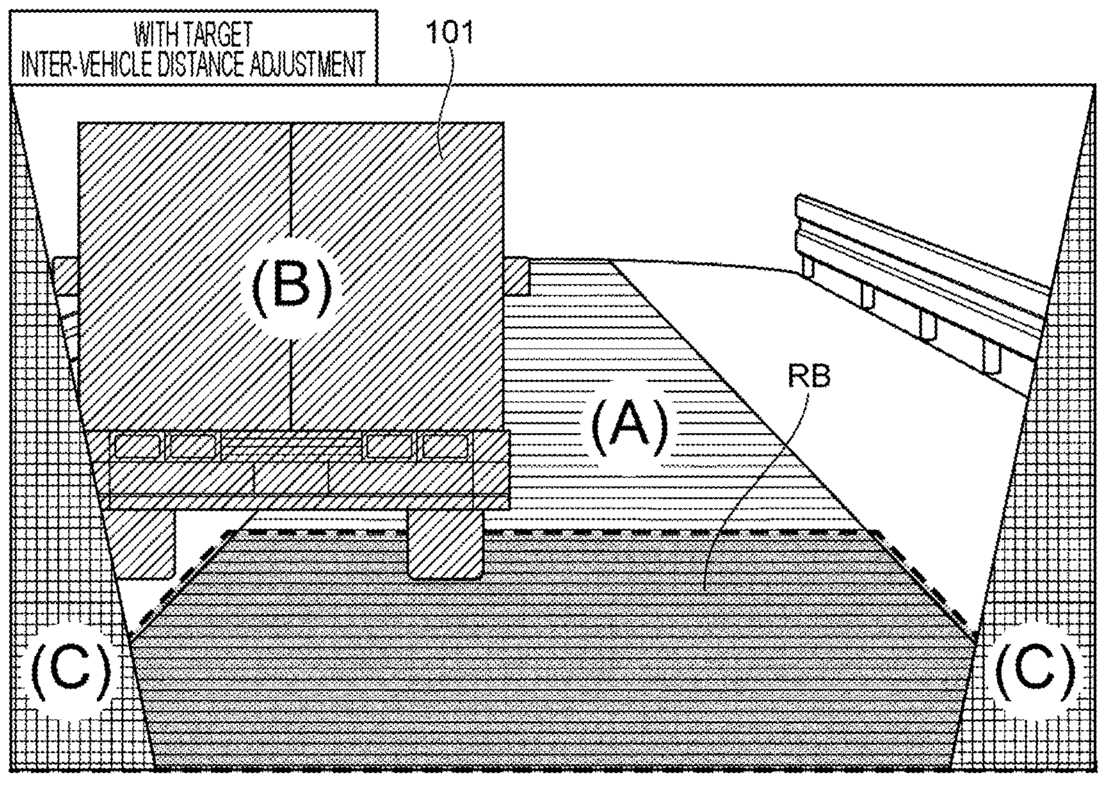
FIG. 24 is an example of a travel scene in which the fear correction point RB in FIG. 22 is applied during the object lane change in Modified example 2.
Figure 25:
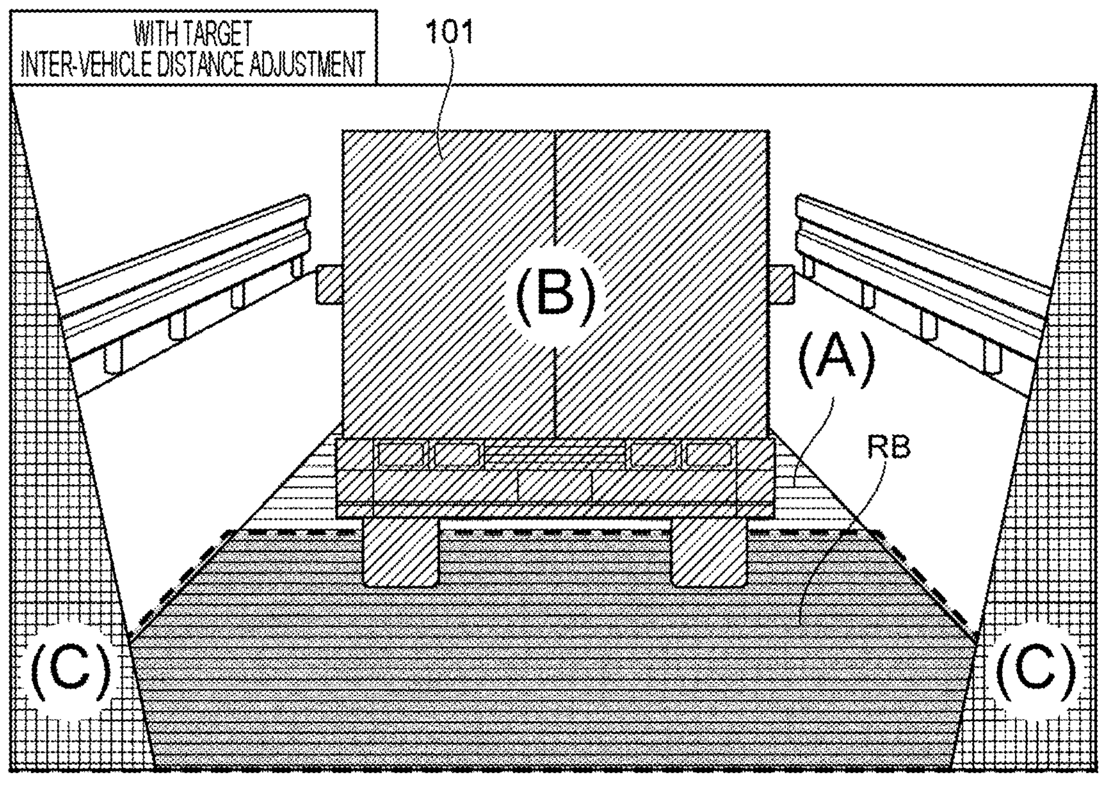
FIG. 25 is an example of a travel scene in which the fear correction point RB in FIG. 22 is applied upon completion of the object lane change in Modified example 2.

FIGS. 23 to 25 illustrate examples in which the fear correction point RB of FIG. 22 is mirrored in a travel scene in which the object 101 traveling in the adjacent lane makes a lane change to the travel lane of the ego-vehicle.

First, referring to FIG. 23, the object 101 is traveling in an adjacent lane and has not entered the travel lane of the ego-vehicle. Therefore, because the object 101 is not in the fear correction point RB, the default value is used as the target inter-vehicle distance.

Next, referring to FIG. 24, the object 101 changes lanes from the adjacent lane to the travel lane of the ego-vehicle, and enters the travel lane of the ego-vehicle. Therefore, the object 101 is in the fear correction point RB, and therefore the maximum target inter-vehicle distance (not the default value) is used as the target inter-vehicle distance.

Next, referring to FIG. 25, the object 101 completes the lane change from the adjacent lane to the travel lane of the ego-vehicle, and travels in front on the travel lane of the ego-vehicle. Accordingly, the object 101 is in the fear correction point RB, and therefore the maximum target inter-vehicle distance is used as the target inter-vehicle distance.

As described above, by using the fear correction point RB set in advance by the vehicle control system, even in a case where the calculated travel lane area (A) is greater than the threshold value with respect to the object 101 performing the lane change to the travel lane of the ego-vehicle, the target inter-vehicle distance can be changed to the maximum target inter-vehicle distance in a case where the object 101 is in the fear correction point RB set in advance by the vehicle control system. That is, in response to the lane change of the object 101, the target inter-vehicle distance can be changed with favorable responsiveness. Therefore, upon detection of the lane change of the object 101, the vehicle can be automatically controlled similarly to manual driving by the user to lower the vehicle speed and extend the inter-vehicle distance.

As described above, the accuracy of the level of fear can be improved using the fear correction point RB set in advance by the vehicle control system, and the vehicle can be controlled using the same sensation as the level of fear the user is made to feel.

Note that the method for setting the region of the fear correction point RB is not limited to the details described in the present embodiment. For example, by using a millimeter wave radar such as the mid-range distance sensor 22 or a LiDER such as the long-range distance sensor 25, the target inter-vehicle distance may be changed to the maximum target inter-vehicle distance in a case where the object 101 is within a distance preset by the vehicle control system.

In addition, in this Modified example 2, a large-sized vehicle has been given as an example of the object 101 performing a lane change, but the object is not limited to a large-sized vehicle, and may also be an ordinary vehicle, a two-wheeled vehicle, or the like. That is, in a case where the object 101 is in the fear correction point RB, it is desirable that the level of fear the user is made to feel is high regardless of the size of the preceding vehicle blocking area (B) and that the maximum target inter-vehicle distance is used as the target inter-vehicle distance.

In addition, the numerical values of the weights for changing the sizes of the respective regions of the fear correction point RA and the fear correction point RB and the target inter-vehicle distance which are described in Modified examples 1 and 2 are not limited to the method and so forth disclosed in this Modified example.

The method for correcting the level of fear disclosed in Modified examples 1 and 2 is not limited to or by the fear correction point RA and the fear correction point RB. Examples are described below.

Regarding fear correction, in a case where the inter-vehicle distance between the objects 101 is equal to or less than the threshold value, the level of fear may be corrected to the three-dimensional map in FIG. 16 or similar, and the target inter-vehicle distance may be changed on the basis of the corrected level of fear and the calculated travel lane area (A).

The inter-vehicle distance between the objects 101 being equal to or less than the threshold value is, for example, a case where there is a plurality of the objects 101 (detected) and a case where the inter-vehicle distance between the preceding vehicle and the vehicle preceding the preceding vehicle is short. In the above-described travel scene, in a case where the preceding vehicle is overtaking the vehicle preceding the preceding vehicle, the user likely feels that it is desirable for the target inter-vehicle distance between the ego-vehicle 100 and the object 101 to be long, and it is possible to secure an appropriate inter-vehicle distance according to the level of fear the user is made to feel.

Regarding fear correction, in a case where (an index indicating) the behavior of the object 101 is equal to or greater than the threshold value, the level of fear may be corrected to the three-dimensional map of FIG. 16 or the like, and the target inter-vehicle distance may be changed on the basis of the corrected level of fear and the calculated travel lane area (A).

The behavior of the object 101 is determined to be equal to or greater than a threshold value in a case where, for example, vehicle behavior such as wobble of the object 101 and extreme acceleration/deceleration travel is detected. In the travel scene described above, in a case where the object 101 behaves in a suspicious manner, the user likely feels that it is desirable that there is a long target inter-vehicle distance between the ego-vehicle 100 and the object 101, and hence it is possible to secure an appropriate inter-vehicle distance according to the level of fear the user is made to feel.

Regarding fear correction, in a case where (the index indicating) the user state is equal to or greater than the threshold value, the level of fear may be corrected to the three-dimensional map or the like in FIG. 16, and the target inter-vehicle distance may be changed on the basis of the corrected fear and the calculated travel lane area (A). The user state can be detected by a driver state detection unit (not illustrated) mounted on the ego-vehicle 100 and having a known configuration for detecting the state of the user.

The user state is determined to be equal to or greater than the threshold value in the case of, for example, a state of distraction in a frontward direction such as where the user has an inattentive gaze or is operating a terminal such as a mobile phone, or where an awakened state is significantly lowered as in a state of fatigue caused by the user dozing or driving for a long time, for example. In the above-described travel scene, depending on the state of distraction of the user, the user will likely feel that it is desirable that there is a long target inter-vehicle distance between the ego-vehicle 100 and the object 101, and thus an appropriate inter-vehicle distance can be secured according to the level of fear the user is made to feel.

Regarding fear correction, in a case where the recognition rate of feature points (for example, detected by the road surface detection unit 82) which are in the direction of travel of the ego-vehicle is equal to or less than a threshold value, the level of fear may be corrected to the three-dimensional map of FIG. 16 or the like, and the target inter-vehicle distance may be changed on the basis of the corrected fear and the calculated travel lane area (A).

A case where the recognition rate of feature points which are in the direction of travel of the ego-vehicle is equal to or less than the threshold value is, for example, a case where the feature point recognition rate decreases or cannot be recognized due to weather such as rain, snow, or fog, the road surface, a change in direct sunlight and brightness with respect to a sensor, or the shape of the road surface such as a sharp curve or a gradient. In the above-described travel scene, in a case where visibility of the front and the surroundings is difficult due to a change in the travel environment, the user likely feels that it is desirable that the target inter-vehicle distance between the ego-vehicle 100 and the object 101 is long, and it is possible to secure an appropriate inter-vehicle distance according to the level of fear the user is made to feel.

Furthermore, in the present embodiment, the travel lane area (A) is calculated from white lines recognized on the basis of feature points (on the image data) which are in the direction of travel of the ego-vehicle and detected by the long-range distance sensor 25 of a stereo camera or the like included in the ego-vehicle 100. However, because a travel road surface without white lines, a travel environment in which it is difficult to detect white lines, and so forth are assumed, it is also likely that the travel lane area (A) cannot always be calculated from white line information.

Figure 26:
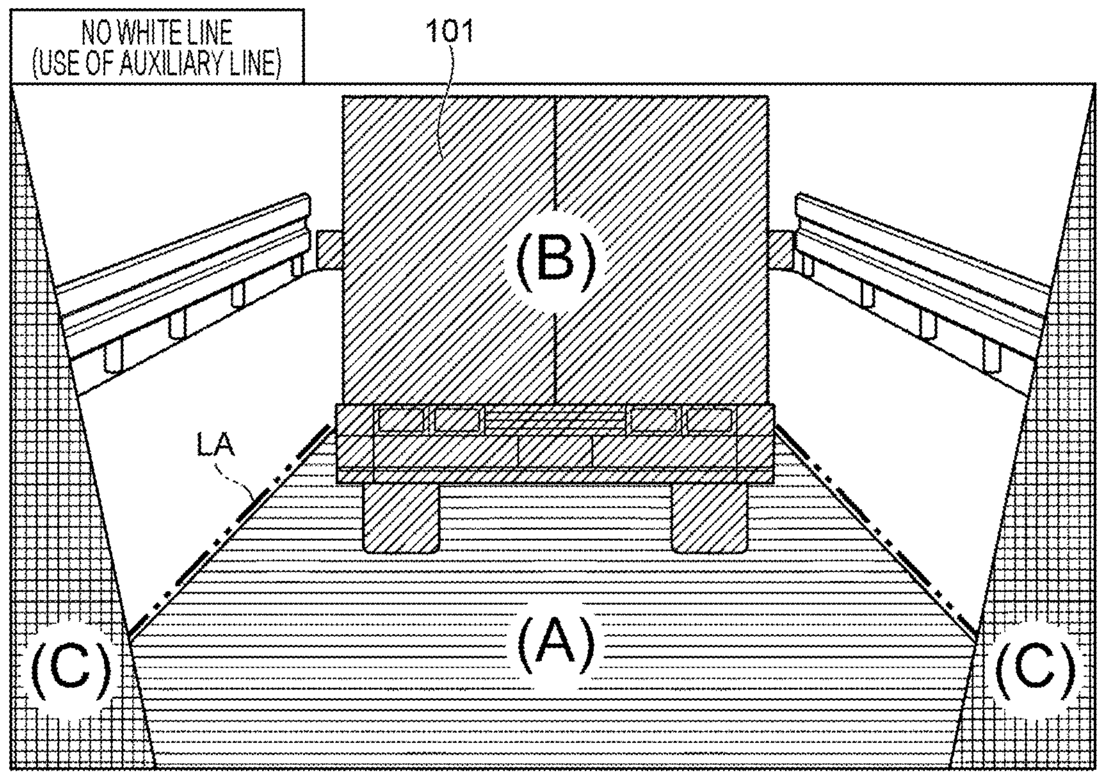
FIG. 26 is an example of a travel scene in which an auxiliary line set in advance in the direction of travel of the ego-vehicle is applied in the vehicle control system according to the present embodiment.

Therefore, in a case where the travel lane area (A) cannot be calculated from white line information, the travel lane area (A) can be calculated, even when white line information cannot be acquired, by using auxiliary lines which are preset in the direction of travel of the ego-vehicle by the present vehicle control system, as per lane LA illustrated in FIG. 26.

Furthermore, in the present embodiment, the user can be notified, via the notification controller 86, of information such as a numerical value for the target inter-vehicle distance and a change in the target inter-vehicle distance, the type of the object 101, or the surrounding travel environment of the ego-vehicle 100 such as feature points and the weather, by using the warning device 41, which is a liquid crystal display or a speaker. As described above, the user is able to check the numerical value of the target inter-vehicle distance, information on a change in the target inter-vehicle distance, and information on the surrounding travel environment and the like, according to the vehicle control system.

Furthermore, in the present embodiment, stoppage of (some or all of) the functions of the present vehicle control system can be performed in light of information on the failure or abnormality of functions and components constituting the present embodiment via the abnormality detection unit 87 and the stop controller 88. By stopping (some or all of) the functions of the vehicle control system according to the situation regarding the factors mentioned above, operation is enabled in a state in which the advantageous effects of the vehicle control system can be exhibited. In addition, in a case where it is likely that the advantageous effects of the present vehicle control system cannot be exhibited, the operating ratio of malfunctions and non-operations can be reduced by stopping functions.

In addition, in the present embodiment, it is possible to notify the user, via the notification controller 86, the abnormality detection unit 87, and the stop controller 88, of information due to failure or an abnormality of functions and components constituting the present embodiment and due to stoppage of functions of the vehicle control system, by using the warning device 41, which is a liquid crystal display or a speaker. As described above, the user can check information that the present vehicle control system has stopped functioning due to any number of factors.

As described above, the vehicle control device 60 according to the present embodiment is a vehicle control device that, as driving assistance, controls driving and/or braking of an ego-vehicle to perform preceding vehicle-tracking automatic travel, the vehicle control device including: a road surface detection unit 82 that detects a travel lane area (A) of a lane on which the ego-vehicle travels; an object detection unit 81 that detects an object which is in the direction of travel of the ego-vehicle (and calculates a preceding vehicle blocking area (B)); a road surface update unit 84 that updates the travel lane area (A) on the basis of the travel lane area (A) of the ego-vehicle detected by the road surface detection unit 82 and the preceding vehicle blocking area (B) imparted to a user by the preceding vehicle detected by the object detection unit 81; and a target inter-vehicle distance adjustment unit 85 that, in light of the travel lane area (A) updated by the road surface update unit 84, adjusts a target inter-vehicle distance between the ego-vehicle and the preceding vehicle.

The vehicle control device further includes a viewing angle calculation unit 63 that calculates, from the speed of the ego-vehicle, a viewing angle blocking area (C) representing the effect of a viewing angle on the user, wherein the road surface update unit 84 mirrors the viewing angle blocking area (C) in the travel lane area (A).

That is, the vehicle control device 60 according to the present embodiment calculates the travel lane area (A) of the ego-vehicle mirroring the area (the preceding vehicle blocking area (B) and the viewing angle blocking area (C)) blocked by the vehicle (preceding vehicle) in front of the ego-vehicle and the speed of the ego-vehicle in the area (the travel lane area (A)) of the lane on which the ego-vehicle travels and detected by the sensor. Further, in a case where the calculated travel lane area (A) of the ego-vehicle is equal to or less than the threshold value, vehicle control is performed to adjust the target inter-vehicle distance between the ego-vehicle and the vehicle in front (driving and/or braking of the ego-vehicle is controlled to perform preceding vehicle-tracking automatic travel).

According to this embodiment, in a case where there is a vehicle in front in the travel lane of the ego-vehicle, vehicle control (preceding vehicle-tracking automatic travel by controlling driving and/or braking of the ego-vehicle) can be performed using an appropriate target inter-vehicle distance by taking into account a narrow viewing angle blocked by the area blocked by the vehicle in front (preceding vehicle blocking area (B)). As a result, it is possible to control the vehicle while reducing the level of fear the user is made to feel.

Although preferred embodiments of the present invention have been described, the present invention is in no way limited to or by the above-described embodiments, and various modifications can be made without departing from the gist of the present invention.

In addition, the present invention is not limited to or by the above-described embodiments, and includes various modifications. For example, the above-described embodiments have been described in detail to facilitate understanding of the present invention, and the present invention is not necessarily limited to having all the described configurations.

In addition, some or all of the above-described configurations, functions, processing units, processing means, and the like may be implemented by hardware, for example, through an integrated circuit design. In addition, each of the above-described configurations, functions, and the like may be implemented by software as a result of a processor parsing and executing a program for implementing each function. Information such as a program, a table, and a file for implementing each function can be stored in a storage device such as a memory, a hard disk, and a solid state drive (SSD), or on a recording medium such as an IC card, an SD card, and a DVD.

Moreover, the control lines and information lines indicate what is considered to be necessary for the description, and do not necessarily indicate all the control lines and the information lines on the product. In practice, it may be considered that almost all the configurations are connected to each other.

REFERENCE SIGNS LIST

11 engine
12 automatic transmission
13 propeller shaft
14 differential gear
15 drive shaft
16 wheel
17 various sensors
18 wheel speed sensor
20 brake device
21 electric power steering
22 (22A to 22D) mid-range distance sensor
25 long-range distance sensor
28 wheel sensor
29 input switch unit
40 various sensors/actuator ECU
41 warning device
60 vehicle control device
61 front object calculation unit
62 front image calculation unit
63 viewing angle calculation unit
64 inter-vehicle distance mode determination unit
65 target inter-vehicle distance calculation unit
81 object detection unit
82 road surface detection unit
84 road surface update unit
85 target inter-vehicle distance adjustment unit
86 notification controller
87 abnormality detection unit
88 stop controller
100 ego-vehicle
101 object (preceding vehicle)
(A) travel lane area
(B) preceding vehicle blocking area
(C) viewing angle blocking area
RA fear correction point
RB fear correction point
LA auxiliary line preset by vehicle control system

The invention claimed is:

1. A vehicle control device that controls driving and/or braking of an ego-vehicle to perform preceding vehicle-tracking automatic travel, the vehicle control device comprising:

a road surface detection circuit that detects a travel lane area of a lane on which the ego-vehicle travels;

an object detection circuit that detects an object which is in a direction of travel of the ego-vehicle;

a road surface update circuit that updates the travel lane area on a basis of the travel lane area of the ego-vehicle detected by the road surface detection circuit and a preceding vehicle blocking area imparted to a user by a preceding vehicle detected by the object detection circuit;

a target inter-vehicle distance adjustment circuit that, in light of the travel lane area updated by the road surface update circuit, adjusts a target inter-vehicle distance between the ego-vehicle and the preceding vehicle.

2. The vehicle control device according to claim 1, further comprising:

a viewing angle calculation circuit that calculates, from the speed of the ego-vehicle, a viewing angle blocking area representing the effect of a viewing angle on the user, wherein the road surface update circuit mirrors the viewing angle blocking area in the travel lane area.

3. The vehicle control device according to claim 1, wherein the road surface detection circuit calculates the travel lane area on the basis of a feature point which is in the direction of travel of the ego-vehicle or an auxiliary line preset in the direction of travel of the ego-vehicle.

4. The vehicle control device according to claim 1, wherein the object detection circuit detects an outline of the object and calculates the preceding vehicle blocking area on the basis of the preceding vehicle blocking area enclosed by the outline.

5. The vehicle control device according to claim 1, wherein, in a case where there is a plurality of objects and in a case where an inter-vehicle distance between the plurality of objects is equal to or less than a threshold value, the target inter-vehicle distance adjustment circuit adjusts the target inter-vehicle distance between the ego-vehicle and the preceding vehicle.

6. The vehicle control device according to claim 1, wherein, in a case where a behavior of the object is equal to or greater than a threshold value, the target inter-vehicle distance adjustment circuit adjusts the target inter-vehicle distance between the ego-vehicle and the preceding vehicle.

7. The vehicle control device according to claim 1, further comprising:

a driver state detection circuit that detects a state of the user, wherein, in a case where the state of the user detected by the driver state detection circuit is equal to or greater than a threshold value, the target inter-vehicle distance adjustment circuit adjusts the target inter-vehicle distance between the ego-vehicle and the preceding vehicle.

8. The vehicle control device according to claim 1, wherein, in a case where a recognition rate of feature points which are in the direction of travel of the ego-vehicle and detected by the road surface detection circuit is equal to or less than a threshold value, the target inter-vehicle distance adjustment circuit adjusts the target inter-vehicle distance between the ego-vehicle and the preceding vehicle.

9. The vehicle control device according to claim 1, wherein, in a case where the object is in a fear correction point set in advance by the vehicle control device, the target inter-vehicle distance adjustment circuit adjusts the target inter-vehicle distance between the ego-vehicle and the preceding vehicle.

10. The vehicle control device according to claim 1, wherein, in a case where the target inter-vehicle distance is not adjusted in light of the travel lane area, the target inter-vehicle distance adjustment circuit uses a default value as the target inter-vehicle distance.

11. The vehicle control device according to claim 10, wherein the target inter-vehicle distance adjustment circuit uses, as the default value, a value set in advance by the vehicle control device or a value arbitrarily set by the user.

12. The vehicle control device according to claim 1, further comprising a notification controller that notifies the user of a state and a change in the target inter-vehicle distance, information on the object, or travel environment information of the ego-vehicle and information on surroundings thereof.

13. The vehicle control device according to claim 1, further comprising:

an abnormality detection circuit that detects an abnormality of the road surface detection circuit, the object detection circuit, the road surface update circuit, or the target inter-vehicle distance adjustment circuit; and a stop controller that, in a case where the abnormality detection circuit detects an abnormality, stops some or all of functions of vehicle travel control.

14. The vehicle control device according to claim 1, further comprising:

an abnormality detection circuit that detects an abnormality of the road surface detection circuit, the object detection circuit, the road surface update circuit, or the target inter-vehicle distance adjustment circuit;

a stop controller that, in a case where the abnormality detection circuit detects an abnormality, stops some or all of functions of vehicle travel control; and a notification controller that notifies the user in a case where the abnormality detection circuit detects an abnormality or in a case where the stop controller stops some or all of the functions of the vehicle travel control.

15. The vehicle control device according to claim 1, wherein, in a case where the travel lane area is equal to or less than a threshold value, the target inter-vehicle distance adjustment circuit sets the target inter-vehicle distance between the ego-vehicle and the preceding vehicle to a maximum target inter-vehicle distance set in advance by the vehicle control device, and, in a case where the travel lane area is greater than the threshold value, sets the target inter-vehicle distance between the ego-vehicle and the preceding vehicle to a default value set in advance by the vehicle control device.

16. A vehicle control device that controls driving and/or braking of an ego-vehicle to perform preceding vehicle-tracking automatic travel, the vehicle control device comprising:

a road surface detection circuit that detects a travel lane area of a lane on which the ego-vehicle travels;

an object detection circuit that detects an object which is in a direction of travel of the ego-vehicle;

a road surface update circuit that updates the travel lane area on a basis of the travel lane area of the ego-vehicle detected by the road surface detection circuit and a preceding vehicle blocking area imparted to a user by a preceding vehicle detected by the object detection circuit;

a target inter-vehicle distance adjustment circuit that, in light of the travel lane area updated by the road surface update circuit, adjusts a target inter-vehicle distance between the ego-vehicle and the preceding vehicle; and a viewing angle calculation circuit that calculates, from a speed of the ego-vehicle, a viewing angle blocking area representing an effect of a viewing angle on the user, wherein the road surface update circuit mirrors the viewing angle blocking area in the travel lane area.

* * * * *